United States Patent
Tsuji et al.

(10) Patent No.: US 8,703,360 B2
(45) Date of Patent: Apr. 22, 2014

(54) METHOD FOR PRODUCING AN ELECTRODE-MEMBRANE-FRAME ASSEMBLY

(75) Inventors: Yoichiro Tsuji, Osaka (JP); Toshihiro Matsumoto, Osaka (JP); Hiroki Kusakabe, Osaka (JP); Takashi Morimoto, Osaka (JP)

(73) Assignee: Panasonic Corporation, Osaka (JP)

( * ) Notice: Subject to any disclaimer, the term of this patent is extended or adjusted under 35 U.S.C. 154(b) by 841 days.

(21) Appl. No.: 12/745,743

(22) PCT Filed: Dec. 4, 2008

(86) PCT No.: PCT/JP2008/003597
§ 371 (c)(1),
(2), (4) Date: Jun. 2, 2010

(87) PCT Pub. No.: WO2009/072291
PCT Pub. Date: Jun. 11, 2009

(65) Prior Publication Data
US 2010/0248087 A1    Sep. 30, 2010

(30) Foreign Application Priority Data

Dec. 6, 2007   (JP) .................................. 2007-315476

(51) Int. Cl.
*H01M 8/00* (2006.01)
*H01M 4/36* (2006.01)
*H01M 8/10* (2006.01)

(52) U.S. Cl.
USPC ............................ 429/535; 429/534; 429/480

(58) Field of Classification Search
None
See application file for complete search history.

(56) References Cited

U.S. PATENT DOCUMENTS

| 5,464,700 A | 11/1995 | Steck et al. |
|---|---|---|
| 2002/0051902 A1 | 5/2002 | Suenaga et al. |
| 2002/0117780 A1 | 8/2002 | Inoue et al. |
| 2009/0104507 A1 * | 4/2009 | Ohma et al. .................... 429/35 |

FOREIGN PATENT DOCUMENTS

| JP | 5-234606 | 9/1993 | |
|---|---|---|---|
| JP | 7-501417 | 2/1995 | |
| JP | 2002-124276 | 4/2002 | |
| JP | 3368907 | 1/2003 | |
| JP | 2004-039385 | 2/2004 | |
| JP | 2006-310288 | * 11/2006 | ............. H01M 8/02 |
| JP | 3897808 | 3/2007 | |
| WO | 2006/106908 | 10/2006 | |

(Continued)

OTHER PUBLICATIONS

English translation of Kusakabe et al (JP 2006-310288).*

(Continued)

*Primary Examiner* — Yoshitoshi Takeuchi
(74) *Attorney, Agent, or Firm* — Wenderoth, Lind & Ponack, L.L.P.

(57) ABSTRACT

In an electrode-membrane-frame assembly production method, a principal part is formed by an electrolyte membrane, first and second catalyst layers and first and second gas diffusion layers, with the first and second gas diffusion layers arranged with their outer circumferences at different positions. The principal part is arranged in a molding die with a circumferential region of the principal part disposed on a flat region of a primary molded body. A circumferential portion of one of the gas diffusion layers is arranged to oppose a flat region of the primary molded body so that the membrane is interposed between the circumferential portion and the flat region. Subsequently, a secondary molded body is formed to integrate with the primary molded body and the principal part.

8 Claims, 30 Drawing Sheets

(56) References Cited

FOREIGN PATENT DOCUMENTS

| WO | WO 2007/026546 | * | 3/2007 | .............. | H01M 8/02 |
|---|---|---|---|---|---|
| WO | 2007/088049 | | 8/2007 | | |

OTHER PUBLICATIONS

Extended European Search Report issued Sep. 12, 2012 in corresponding European Patent Application No. 08855982.8.

International Preliminary Report on Patentability and Written Opinion of the International Searching Authority issued Aug. 10, 2010, in International (PCT) Application No. PCT/JP2008/003597 (in English).

International Search Report issued Mar. 24, 2009 in International (PCT) Application No. PCT/JP2008/003597.

* cited by examiner

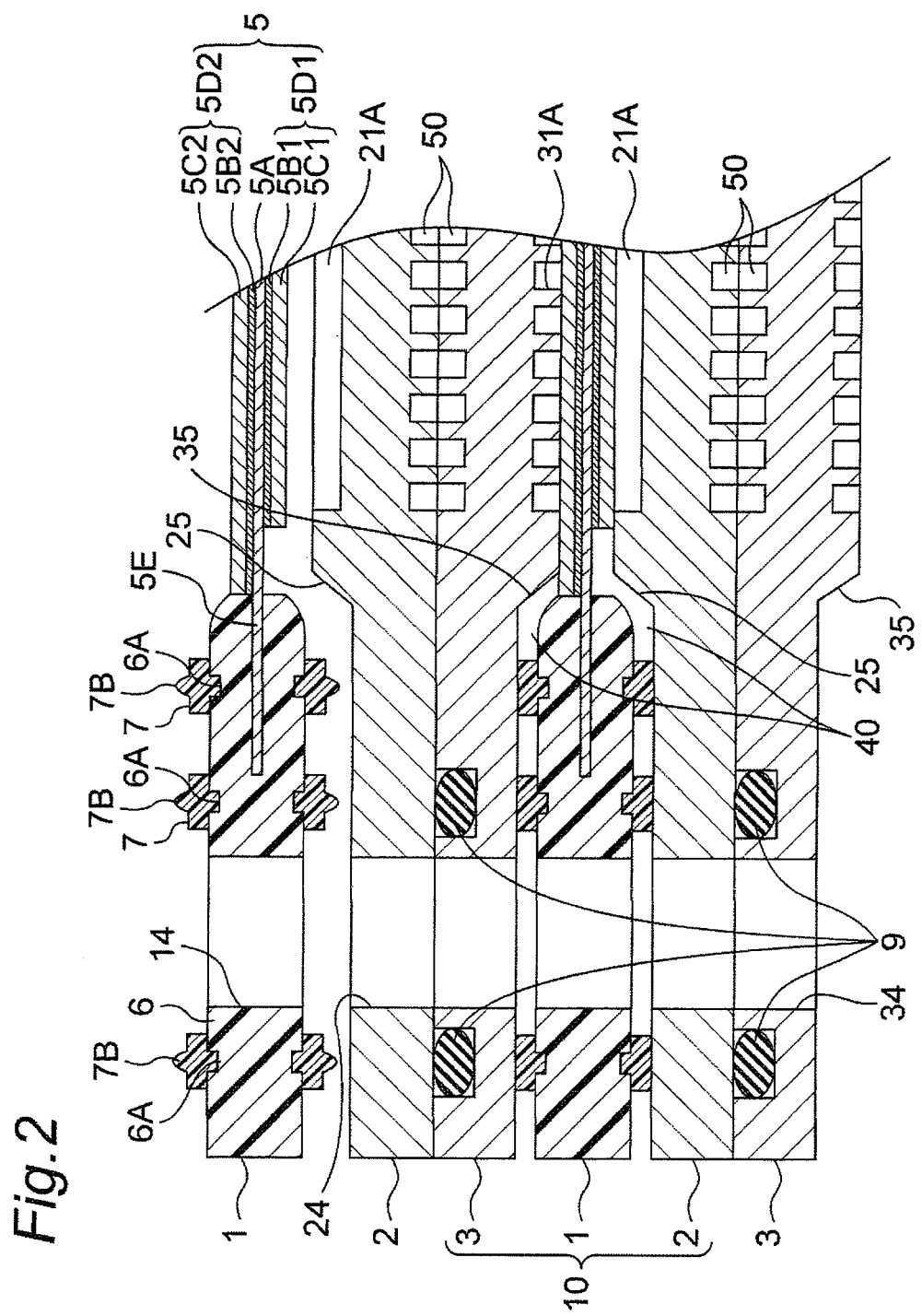

METHOD FOR PRODUCING AN ELECTRODE-MEMBRANE-FRAME ASSEMBLY

TECHNICAL FIELD

The present invention relates to an improvement in a method for producing an electrode-membrane-frame assembly used in a solid polymer electrolyte fuel cell.

BACKGROUND ART

Solid polymer electrolyte fuel cells (hereinafter referred to as PEFCs) are devices wherein a fuel gas containing hydrogen and an oxygen-containing oxidizer gas, such as air, are caused to react electrochemically with each other, thereby generating electric power and heat simultaneously.

In general, PEFCs each have a structure wherein plural cells are laminated onto each other. Any one of the cells has a structure wherein a membrane-electrode assembly (hereinafter referred to as an MEA) is sandwiched between a pair of plate-form conductive separators, specifically, an anode separator and a cathode separator. The MEA is equipped with an MEA principal part, and a frame arranged to extend over a circumferential region (or the periphery) of the MEA principal part and further surround the MEA principal part. Herein, the MEA equipped with the frame is referred to as an electrode-membrane-frame assembly.

The MEA principal part includes a polymer electrolyte membrane the circumferential region of which is supported by the frame, and paired electrode layers that are formed on both surfaces of the polymer electrolyte membrane, respectively, and are further arranged inside the frame. The paired electrode layers include catalyst layers of platinum or the like that are formed on both surfaces of the polymer electrolyte membrane, respectively, and porous, conductive gas diffusion layers formed on the catalyst layers, respectively. When a fuel gas and an oxidizer gas contact the paired electrode layers, respectively, electrochemical reaction is generated to generate electric power and heat. In the meantime, a gasket is set up on a surface of the frame to seal gaps between the surface and the separators, and the gasket blocks or restrains a leakage of the fuel gas and the oxidizer gas to the outside.

Hereinafter, a process of a first conventional example for producing an MEA will be described. FIG. 20A to FIG. 20D are schematic explanatory views illustrating the process of the first conventional example for producing an MEA, wherein a joint region between an MEA principal part and a frame is enlarged and shown.

As illustrated in FIG. 20A, a first mold T101 and a second mold T102 are clamped to each other to mold a primary molded body 106A constituting a portion of a frame 106.

Thereafter, the second mold T102 is removed. As illustrated in FIG. 20B, an MEA principal part 105 is arranged into a depression T101A in the first mold 1101, the part 105 being a part wherein paired electrode layers 105D are formed on both surfaces of a polymer electrolyte membrane 105A, respectively, and inside a circumferential region of the polymer electrolyte membrane 105A. At this time, the circumferential region 105E of the MEA principal part 105 is arranged on a flat region T101B of the first mold T101 and a flat region 106A1 of the primary molded body 106A.

Next, as illustrated in FIG. 20C, the first mold T101, wherein the MEA principal part 105 is arranged, and a third mold T103 are clamped to each other so as to mold a secondary molded body 106B constituting the other portion of the frame 106. In this way, the primary molded body 106A and the secondary molded body 106B are integrated with each other to form the frame 106.

Next, from the first mold T101 and the third mold T103, the MEA principal part 1105, to which the frame 106 is joined, is taken out, and the workpiece is arranged between a fourth mold T104 and a fifth mold T105. Next, as illustrated in FIG. 20D, the fourth mold T104 and the fifth mold T105 are clamped to each other, and then a gasket 107 is molded onto a surface of the frame 106.

In the MEA having a structure as described above in the first conventional example, the following region is present between the electrode layers 105D and the frame 106: a region where the polymer electrolyte membrane 105A is alone present, that is, a region of the polymer electrolyte membrane 105A that is neither supported by the electrode layers 105D nor the frame 106. Therefore, from a viewpoint of handling, and from a viewpoint of preventing the polymer electrolyte membrane 105A from being broken by a difference in pressure between fuel gas and oxidizer gas or by some other cause when the fuel cell is driven, the polymer electrolyte membrane 105A positioned between the electrode layers 105D and the frame 106 is reinforced. Techniques for such reinforcement are disclosed in, for example, Japanese Patent No. 3368907 and Japanese Patent No. 3897808.

FIG. 21A to FIG. 21D are schematic explanatory views illustrating a process of a second conventional example for producing an MEA, disclosed in Japanese Patent No. 3368907, wherein a joint region between an MEA principal part and a frame is enlarged and shown. As illustrated in FIG. 21A to FIG. 21D, in the MEA in the second conventional example, a reinforcing membrane 108 is set into a picture frame form over the circumferential region 105E of an MEA principal part 105 to reinforce a polymer electrolyte membrane 105A, and then a frame 106 and a gasket 107 are molded.

FIG. 22A to FIG. 22D are schematic explanatory views illustrating a process of a third conventional example for producing an MEA, disclosed in Japanese Patent No. 3897808, wherein a joint region between an MEA principal part and a frame is enlarged and shown. As illustrated in FIG. 22A to FIG. 22D, in the MEA of the third conventional example, sixth and seventh molds T106 and T107 are used instead of the fourth and fifth molds T104 and T105. In this way, a gasket 107A is molded to cover a polymer electrolyte membrane 105A positioned between electrode layers 105D and a frame 106, so as to reinforce the polymer electrolyte membrane 105A.

However, according to the technique of the second conventional example, wherein the reinforcing membrane 108 is set up, the number of parts naturally increases, and further the number of steps for the production increases. Furthermore, when the reinforcing membrane 108 is formed by, for example, punching-out in order to form the reinforcing membrane 108 into a picture frame form, the punched-out region is lost, and others are caused. Thus, disadvantages in costs are caused.

The technique of the third conventional example, wherein the gasket 107A is molded, causes the following: at the time of causing a material which is to constitute the gasket 107A, for example, a thermoplastic resin to flow into the molds T106 and T107, pressures applied to both surfaces of the polymer electrolyte membrane 105A may become uneven. Therefore, as represented by a region surrounded by a broken line in FIG. 23, the polymer electrolyte membrane 105A deforms (for example, it becomes wavy). It is therefore necessary to raise a precision of the molds T106 and T107, or control the resin pressures strictly in order to restrain the deformation.

SUMMARY OF THE INVENTION

Accordingly, an object of the invention is to provide a method for producing an electrode-membrane-frame assembly which makes it possible to prevent its polymer electrolyte membrane from being broken or deformed without needing to raise the precision of molds or controlling the resin pressures strictly in order to improve the above-mentioned issues.

In order to achieve the above-mentioned objects, the present invention is provided with the following arrangements:

According to a first aspect of the present invention, a method is provided for producing an electrode-membrane-frame assembly by forming a frame around a circumferential region of an electrode-membrane-frame assembly principal part, the principal part having a first catalyst layer arranged on one of surfaces of a polymer electrolyte membrane, a first gas diffusion layer arranged on a surface of the first catalyst layer and inside the circumferential region of the electrolyte membrane, a second catalyst layer arranged on the other surface of the electrolyte membrane, and a second gas diffusion layer arranged on a surface of the second catalyst layer and inside the circumferential region of the electrolyte membrane so as to make a position of an outer circumference of the second gas diffusion layer different from that of an outer circumference of the first gas diffusion layer, the method comprising:

arranging the circumferential region of the principal part on a flat region, in a state that a portion of the flat region located in a frame inner-circumference portion of a frame-form primary molded body which is fitted into a first molding die and constitutes a portion of the frame, the flat region portion being in parallel to a plane direction of the electrolyte membrane, and an outer circumferential portion of either the first gas diffusion layer or the second gas diffusion layer, the outer circumferential portion being positioned outside a region of the first and second gas diffusion layers wherein the two layers are opposed to each other to interpose the electrolyte membrane therebetween, are opposed to each other in a thickness direction of the electrolyte membrane so as to interpose the electrolyte membrane therebetween;

clamping a second molding die to the first molding die into which the primary molded body wherein the principal part is arranged is fitted; and causing a thermoplastic resin to flow into between the first molding die together with the primary molded body and the second molding die to mold a secondary molded body constituting another portion of the frame, thereby forming the frame.

According to a second aspect of the present invention, there is provided the method for producing an electrode-membrane-frame assembly according to the first aspect, wherein when the secondary molded body is molded, the molding of the secondary molded body is attained to cause a portion of the resin constituting the secondary molded body to be present so as to be intermixed with the outer circumferential portion.

According to a third aspect of the present invention, there is provided the method for producing an electrode-membrane-frame assembly according to the first aspect, wherein when the frame is formed, the formation of the frame is attained while a gap is made between the first and second gas diffusion layers and the frame, the principal part wherein the frame is formed is arranged between a third molding die and a fourth molding die, and then the third molding die and the fourth molding die are clamped to each other, a thermoplastic resin or thermoplastic elastomer is caused to flow into between the third and fourth molding dies and the principal part wherein the frame is formed, thereby molding an elastic body in the gap and a portion of the surface of the frame in continuous manner.

According to a fourth aspect of the present invention, there is provided the method for producing an electrode-membrane-frame assembly according to the third aspect, wherein when the elastic body is molded, and the formation of the elastic body is attained to cause a portion of the resin or elastomer to be present to be intermixed with the outer circumferential portion.

According to a fifth aspect of the present invention, there is provided the method for producing an electrode-membrane-frame assembly according to the first aspect, wherein the second molding die is clamped to the first molding die in a state that the circumferential region of the principal part is arranged on the flat region and then a pushing member is arranged on the circumferential region of the principal part to restrain the circumferential region of the principal part from rising away from the flat region.

According to a sixth aspect of the present invention, there is provided the method for producing an electrode-membrane-frame assembly according to any one of the first to fifth aspects, wherein the second gas diffusion layer is formed into a size permitting the layer to be included in the first gas diffusion layer, and is arranged to be included in the first gas diffusion layer in the thickness direction of the electrolyte membrane, whereby the second gas diffusion layer is arranged to make the outer circumference thereof different from that of the outer circumference of the first gas diffusion layer.

According to a seventh aspect of the present invention, there is provided the method for producing an electrode-membrane-frame assembly according to any one of the first to fifth aspects, wherein the first and second gas diffusion layers are each formed into a rectangular form, and the second gas diffusion layer is arranged to cause the long sides thereof to intersect with the paired long sides of the first gas diffusion layer, respectively, whereby the second gas diffusion layer is arranged to make the outer circumference thereof different from that of the outer circumference of the first gas diffusion layer.

According to an eighth aspect of the present invention, there is provided the method for producing an electrode-membrane-frame assembly according to any one of the first to fifth aspects, wherein the first gas diffusion layer and the second gas diffusion layer are formed into the same size, and the second gas diffusion layer is arranged to be deviated from the first gas diffusion layer in the plane direction of the electrolyte membrane while the second gas diffusion layer has a region overlapping with the first gas diffusion layer in the thickness direction of the electrolyte membrane, whereby the second gas diffusion layer is arranged to make the position of the outer circumference thereof different from that of the outer circumference of the first gas diffusion layer.

According to a ninth aspect of the invention, provided is the method for producing an electrode-membrane-frame assembly by laying first and second catalyst layers on both surfaces of a polymer electrolyte membrane, respectively, arranging first and second gas diffusion layers, into a lamination state, onto the surfaces of the first and second catalyst layers, respectively to form an electrode-membrane-frame assembly principal part, and then forming a frame around the circumferential region of the formed principal part, in which:

the principal part is formed by laying the first catalyst layer onto one of surfaces of the electrolyte membrane, arranging the first gas diffusion layer onto the surface of the first catalyst layer and inside the circumferential region of the electrolyte membrane, laying the second catalyst layer onto the other surface of the electrolyte membrane, and arranging the second gas diffusion layer onto the surface of the second catalyst layer and inside the circumferential region of the electrolyte membrane so as to make the position of the outer circumference of the second gas diffusion layer different from that of the outer circumference of the first gas diffusion layer; and the frame is formed as follows: in a state that an outer circumferential portion of either the first gas diffusion layer or the second gas diffusion layer, the portion being positioned outside a region of the first and second gas diffusion layers wherein the two layers are opposed to each other to interpose the electrolyte membrane therebetween, is opposed to a portion of a flat region located in the frame inner-circumference portion of a frame-form primary molded body, the flat region being in parallel to a plane direction of the electrolyte membrane, in the thickness direction of the electrolyte membrane so as to interpose the electrolyte membrane therebetween, the circumferential region of the principal part is arranged on the flat region, and subsequently a secondary molded body is formed, the molded body being a body combined with the primary molded body to cover the circumferential region of the electrolyte membrane.

According to the method of the invention for producing an electrode-membrane-frame assembly, the principal part is formed to make the position of the outer circumference of the first gas diffusion layer different from that of the outer circumference of the second gas diffusion layer. In other words, the above-mentioned outer circumferential portion, which is positioned outside the region (of the first and second gas diffusion layers) wherein the first and second gas diffusion layers are opposed to each other to interpose the electrolyte membrane therebetween, is formed to be present inside either the first gas diffusion layer or the second gas diffusion layer. In such a manner that the outer circumferential portion is opposed to the portion of the flat region of the frame inner-circumference of the primary molded body, the circumferential region of the principal part is arranged onto the flat region, and subsequently the secondary molded body is molded to form the frame. In this way, at the time of molding the secondary molded body, the electrolyte membrane is supported, in the plane direction thereof, by either the outer circumferential portion or the flat region.

Accordingly, even when the injection pressure of the resin constituting the secondary molded body is applied to the electrolyte membrane along the thickness direction of the membrane, the electrolyte membrane is prevented from being broken or deformed. It is therefore unnecessary to raise the precision of the molds or control the resin pressures strictly.

BRIEF DESCRIPTION OF THE DRAWINGS

These and other aspects and features of the present invention will become clear from the following description taken in conjunction with the preferred embodiments thereof with reference to the accompanying drawings, in which:

FIG. 2 is a sectional view wherein a cross section of a lamination of a cell, on each line II-II in FIG. 1, is partially exploded and illustrated.

DETAILED DESCRIPTION OF THE INVENTION

Figure 1:
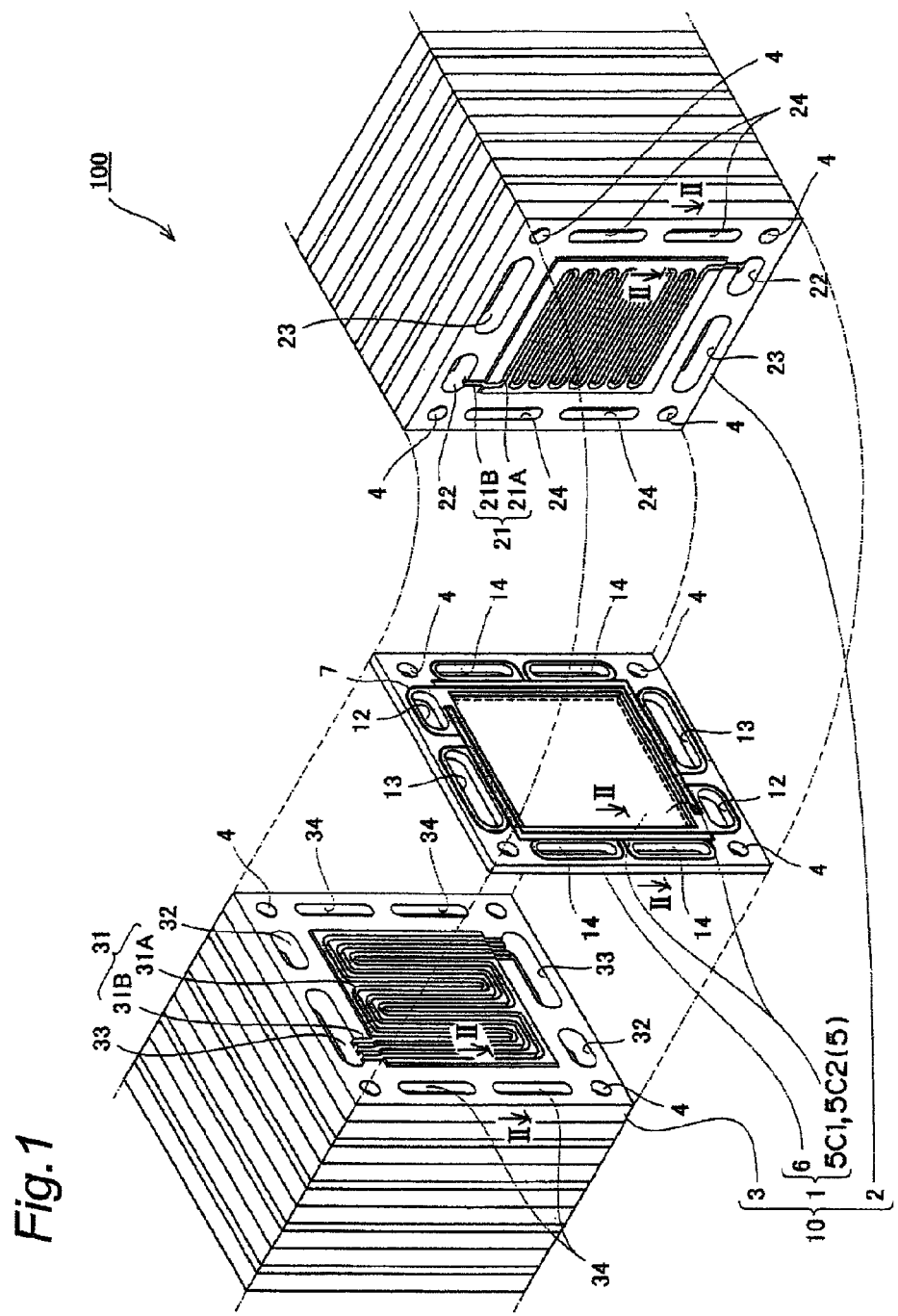
FIG. 1 is a perspective view wherein the structure of a solid polymer electrolyte fuel cell according to a first embodiment of the invention is partially exploded and schematically illustrated.

Before the description of the present invention proceeds, it is to be noted that like parts are designated by like reference numerals throughout the accompanying drawings.

With reference to the drawings, embodiments of the invention will be described hereinafter.

First Embodiment

FIG. 1 is a perspective view wherein a structure of a solid polymer electrolyte fuel cell having an electrode-membrane-frame assembly related to a first embodiment of the invention is partially exploded and schematically illustrated.

As illustrated in FIG. 1, a solid polymer electrolyte fuel cell (PEFC) 100 is formed so that cells (single-cell modules) 10, which are each a basic unit structure, are laminated onto each other. Collector plates, insulating plates, and end plates, which are not illustrated, are fitted to outermost layers of both ends of the cells 10, and the cells 10 are formed to be pushed from both ends, and clamped or joined to each other by means of clamping bolts (not illustrated) inserted into bolt holes 4 and nuts (not illustrated). In the first embodiment, sixty of the cells 10 are laminated onto each other, and the bolts inserted into the bolt holes 4 and the nuts are joined to each other at a joining force of 10 kN.

Each of the cells 10 has a structure wherein a frame 6 (more precisely, a gasket 7) on circumferential regions of both surfaces of an electrode-membrane-frame assembly (hereinafter referred to as an MEA) 1 is sandwiched between a pair of conductive separators, more specifically, an anode separator 2 and a cathode separator 3. In this way, gas diffusion layers 5C1 and 5C2 (see FIG. 2) laid at outermost electrode layers of an MEA principal part 5, which will be described later, contact surfaces of the separators 2 and 3, respectively, and further a fuel gas flow passage and an oxidizer gas flow passage are defined by the following: a gas diffusion layer contacting region 21A of a fuel gas flow passage groove 21 in the anode separator 2 and a gas diffusion layer contacting region 31A of an oxidizer gas flow passage groove 31 in the cathode separator 3; and the gas diffusion layers 5C1 and 5C2. This makes it possible that a fuel gas flowing in the gas diffusion layer contacting region 21A contacts the gas diffusion layer 5C1 on the anode separator 2 side, and an oxidizer gas flowing in the gas diffusion layer contacting region 31A contacts the gas diffusion layer 5C2 on the cathode separator 3 side to cause an electrochemical reaction in the PEFC 100. In the laminated cells 10, any adjacent ones of the MEA principal parts 5 are connected electrically to each other in series or in parallel.

In the separators 2 and 3, and the frame 6, the following holes are made: paired through holes in which the fuel gas flows, and paired ones in which the oxidizer gas flows, that is, fuel gas manifold holes 12, 22 and 32, and oxidizer gas manifold holes 13, 23 and 33. In the state that the cells 10 are laminated onto each other, these through holes are laminated and linked to each other to make a fuel gas manifold and an oxidizer gas manifold.

In an inside main surface of the anode separator 2, the fuel gas flow passage groove 21 is made so that the paired fuel gas manifold holes 22 and 22 are linked with each other through the groove 21. In an inside main surface of the cathode separator 3, the oxidizer gas flow passage groove 31 is made so that the paired oxidizer gas manifold holes 33 and 33 are linked with each other through the groove 31. In other words, the PEFC 100 has a structure wherein the oxidizer gas and the fuel gas are each branched from one of the manifolds (i.e., the supply side manifold) to the flow passage groove 21 or 31 and then circulated to the other of the manifolds (i.e., the discharge side manifold).

In the state that each of the cells 10 is fabricated, the fuel gas flow passage groove 21 is formed to have the gas diffusion layer contacting region 21A formed in the surface contacting the gas diffusion layer 5C1, and a pair of connecting regions (flow passage connection grooves) 21B formed to bridge a gap between the surface contacting the gas diffusion layer 5C1 and the surface facing the periphery of the gas diffusion layer 5C1. In the same manner, in the state that each of the cells 10 is fabricated, the oxidizer gas flow passage groove 31 is formed to have the gas diffusion layer contacting region 31A formed in the surface contacting the gas diffusion layer 5C2, and a pair of connecting regions (flow passage connection grooves) 31B formed to bridge a gap between the surface contacting the gas diffusion layer 5C2 and the surface facing the periphery of the gas diffusion layer 5C2. In this case, the connecting regions 21B, 31B are formed so that the paired manifold holes 22, 33 are linked to the gas diffusion layer contacting regions 21A, 31A. In this way, the oxidizer gas and the fuel gas are branched, respectively, from the supply-side fuel gas manifold hole 22 and oxidizer gas manifold hole 33 into the connecting regions 21B and 31B, and then contact the gas diffusion layers 5C1 and 5C2 in the gas diffusion layer contacting regions 21A and 31A, respectively. As a result, an electrochemical reaction is caused. Extra gases of the oxidizer gas and the fuel gas, and a reaction product are passed through the connecting regions 21B and 31B connected to the discharge-side fuel gas manifold hole 22 and oxidizer gas manifold hole 33, respectively, and then discharged to the discharge side fuel gas manifold hole 22 and oxidizer gas manifold hole 33, respectively.

The gasket 7 is arranged on both main surfaces of the frame 6 of each of the MEAs 1. The gasket 7 is arranged to cause the oxidizer gas and the fuel gas not to flow from the predetermined flow passage grooves 21 and 31 to an outside of the flow passage grooves 21 and 31. In other words, the gasket 7 is arranged to surround circumferences of the manifold holes 12, 13 and 14, and a circumference of the frame. In the state that the cell 10 is fabricated, on the anode separator 2 side, the gasket 7 is not arranged at a position that the connecting regions 21B of the fuel gas flow passage groove 21 contact, and further the gasket 7 is arranged so as to surround the fuel gas manifold holes 12 and the MEA principal part 5 into a unified form. In the same manner, in the state that the cell 10 is fabricated, on the cathode separator 3 side, the gasket 7 is not arranged at a position that the connecting regions 31B of the fuel gas flow passage groove 31 contact, and further the gasket 7 is arranged so as to surround the oxidizer gas manifold holes 13 and the MEA principal part 5 into a unified form.

In this manner, the gasket 7 neither hinders the fuel gas flowing in the gap between the fuel gas manifold holes 12 and the MEA principal part 5, nor the oxidizer gas flowing in the gap between the oxidizer gas manifold holes 33 and the MEA principal part 5, so that the fuel gas and the oxidizer gas are prevented from flowing to the outside of the flow passage grooves 21 and 31. In FIG. 1, the gasket 7, and meandering structures of the flow passage grooves 21 and 31 in the gas diffusion layer contacting regions 21A and 31A of the separators 2 and 3 are schematically illustrated for convenience of the description.

Each of the manifolds may be constructed by a so-called external manifold. In the case of adopting the structure of the external manifold, in the MEA 1 and the separators 2 and 3 the fuel gas manifold holes 12, 22 and 32, and the oxidizer gas manifold holes 13, 23 and 33 are not made. The connecting regions 21B and 31B of the fuel gas flow passage groove 21 and the oxidizer gas flow passage groove 31 are extended to end faces of the separators 2 and 3, respectively. A pipe for supplying each of the fuel gas and the oxidizer gas is branched to ends faces of the separator 2 or 3, and joined thereto. In the case of the external manifold, the gasket 7 is arranged to extend, along the circumference of each of the connecting regions 21B and 31B of the fuel gas flow passage groove 21 and the oxidizer gas flow passage groove 31, to end faces of the frame 6.

In the separators 2 and 3 and the frame 6, water manifold holes 14, 24 and 34, which form two pairs of manifolds wherein cooling water (for example, pure water) is circulated, are made in the same manner as the fuel gas manifold holes 12, 22 and 32, and the oxidizer gas manifold holes 13, 23 and 33. In this way, these manifold holes are laminated and linked to each other, so as to form the two paired water manifolds in the state that the cells 10 are laminated onto each other.

Figure 3A:
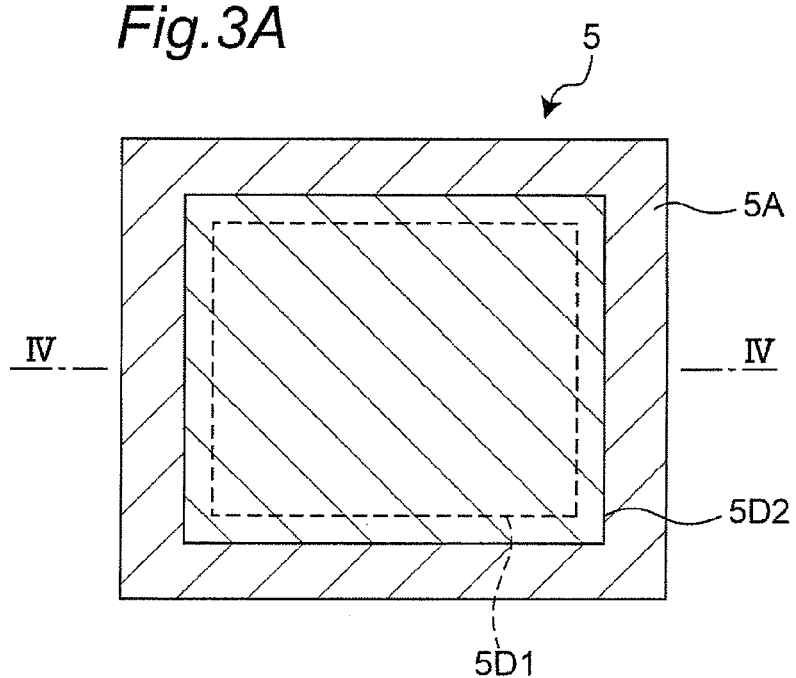
FIG. 3A is a plan view of an MEA principal part of an MEA related to the first embodiment of the invention.
Figure 3B:
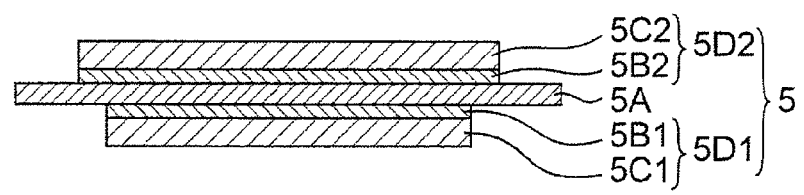
FIG. 3B is a sectional view on line IV-IV in FIG. 3A.

FIG. 2 is a sectional view wherein a cross section of a lamination of one of the cells 10, the cross section being in a cross section on each line II-II in FIG. 1, is partially exploded and illustrated, FIG. 3A is a plan view of the MEA principal part 5, and FIG. 3B is a sectional view on line IV-IV in FIG. 3A.

The MEA principal part 5 includes a polymer electrolyte membrane 5A for transporting hydrogen ions selectively, and a pair of electrode layers 5D1 and 5D2 (i.e., electrode layers of an anode and a cathode) formed on both surfaces of the polymer electrolyte membrane 5A, respectively. The paired electrode layers 5D1 and 5D2 are made of bilayered structures, respectively, which include catalyst layers 5B1 and 5B2, which are examples of first and second catalyst layers, respectively, and gas diffusion layers 5C1 and 5C2, which are examples of first and second gas diffusion layers, respectively. The polymer electrolyte membrane 5A is made of a solid polymer material exhibiting proton conductivity, for example, a perfluorosulfonic acid membrane (Nafion membrane, manufactured by Du Pont). The catalyst layers 5B1 and 5B2 are usually made mainly of carbon powder on which a platinum metal catalyst is carried, and are formed on the surfaces of the polymer electrolyte membrane 5A, respectively. The gas diffusion layers 5C1 and 5C2 are formed on the surfaces of the catalyst layers 5B1 and 5B2, respectively, and have both of permeability of the fuel gas or the oxidizer gas and electron conductivity. The gas diffusion layers 5C1 and 5C2 may each be a layer containing a base material made of carbon fiber, for example, a carbon fiber woven cloth or nonwoven cloth. The gas diffusion layers 5C1 and 5C2 may each be a porous sheet obtained, without using carbon fiber as a base material thereof, by kneading a mixture containing at least carbon powder and a binder (such as PTFE: polytetrafluoroethylene), and then molding the mixture into a sheet form. This porous sheet may contain a small amount of carbon fiber.

As illustrated in FIG. 3A and FIG. 3B, the paired electrode layers 5D1 and 5D2 are formed to make each of the layers smaller than the polymer electrolyte membrane 5A in external shape size and further make the anode electrode layer 5D1 smaller than the cathode electrode layer 5D2 in external shape size, and are formed to cause a position of an outer circumference of the anode electrode layer 5D1 to be inside that of an outer circumference of the cathode electrode layer 5D2. In other words, the anode electrode layer 5D1 is formed into a size permitting the layer 5D1 to be included in the cathode electrode layer 5D2, and is arranged to be included in the cathode electrode layer 5D2 in the thickness direction of the polymer electrolyte membrane 5A.

As illustrated in FIG. 2, the outer circumference of the cathode electrode layer 5D2 is connected to the inner circumference of the frame 6. In a region of the cathode electrode layer 5D2 near the outer circumference thereof, a resin which is to constitute the frame 6 partially enters the gas diffusion layer 5C1 so that they are present to be intermixed with each other. In this way, the cathode electrode layer 5D2 and the frame 6 are strongly fixed to each other, and the MEA principal part 5 and the frame 6 are more strongly fixed to each other. It is preferred that the region where the resin constituting the frame 6 and the gas diffusion layer 5C2 are present to be intermixed with each other is positioned outside the outer circumference of the anode electrode layer 5D1 since the region does not cause the desired electrochemical reaction easily.

The anode separator 2 and the cathode separator 3 are each in a flat plate form, and their surfaces (i.e. the inner surfaces) contacting the MEA 1 have a step 25 and a step 35, respectively, to cause their central regions to be each projected into a trapezoidal form, correspondingly to the shape of the MEA 1, more specifically, correspondingly to each step based on a difference in thickness between the frame 6 and the MEA principal part 5. It is sufficient for the separators 2 and 3 that they are each made of a gas impermeable material. The separators may each be, for example, a member obtained by cutting a resin-impregnated carbon material into a predetermined shape, or a member obtained by molding a mixture made of carbon powder and resin material. In this case, the separators 2 and 3 are glassy carbon pieces (thickness: 3 mm) manufactured by Tokai Carbon Co., Ltd. About the separators 2 and 3, the various manifold holes 22, 23, 24, 32, 33 and 34, and the bolt holes 4 penetrate therethrough in the thickness direction of the separators 2 and 3.

The fuel gas flow passage groove 21 and the oxidizer gas flow passage groove 31 are made in the inner surfaces of the separators 2 and 3, respectively. Water flow passage grooves 50 are formed in the rear surfaces of the separators 2 and 3, respectively. Cutting work, or molding or shaping work is used to make the various manifold holes 22, 23, 24, 32, 33 and 34, the bolt holes 4, the fuel gas flow passage groove 21, the oxidizer gas flow passage groove 31, the water flow passage grooves 50 and so on.

The water flow passage grooves 50 are each made so that the two paired water manifold holes 24 or 34 are connected to each other through the groove. In other words, cooling water is branched from the manifolds on one side, that is, the supply-side manifolds to the water flow passage groove 50, and then circulated to the manifolds on the other side, that is, the discharge-side manifolds. In this manner, the cell 10 can be kept at a predetermined temperature suitable for the electrochemical reaction by heat conducting power of water. In the same manner as with the fuel gas and the oxidizer gas, cooling water supplying/discharging flow passages may be formed to have an external manifold structure without forming the water manifold holes 14, 24 nor 34 in the separators 2 and 3, and the frame 6. Furthermore, it is allowable to insert a cooling unit wherein cooling water is circulated between any adjacent ones of the cells 10 without forming the water flow passage grooves 50 in the rear surfaces of the separators 2 and 3, and laminate the cells 10 onto each other.

The gasket 7 is made of an elastic body, and is deformed by pushing or pressing the MEA 1 and the separators 2 and 3, so as to seal the circumference of the MEA principal part 5 and that of the manifold holes 14. About the fuel gas manifold holes 12 and the oxidizer gas manifold holes 13 also, the circumferences of the individual manifold holes are sealed by the gasket 7 in the same way (see FIGS. 3A and 3B).

The frame 6 is made of a thermoplastic resin. This thermoplastic resin is chemically clean and stable at the driving temperature of the PEFC 100, and has an appropriate elastic modulus and a relatively high load-deflection temperature. When a width of the fuel gas flow passage groove 21 and the oxidizer gas flow passage groove 31 of the separators 2 and 3 are, for example, from about 1 to 2 mm, and a thickness of the frame 6 is, for example, about 1 mm or less, a compression modulus of the frame 6 is preferably at least 2,000 MPa or more. The elasticity referred to herein is the compression modulus measured by the compression modulus measuring method specified in JIS-K7181. The driving temperature of the PEFC 100 is generally 90° C. or lower; thus, the load-deflection temperature of the frame 6 is preferably 120° C. or higher. It is preferred from the viewpoint of chemical stability that the frame 6 is not any non-crystalline resin but a crystalline resin. In particular, the resin is preferably a material having a large mechanical strength and a high heat resistance. The material is preferably a resin in the so-called super-engineering plastic grade for example, polyphenylene sulfide (PPS), polyetheretherketone (PEEK), liquid crystal polymer (LCP), and polyethernitrile (PEN). These have a compression modulus from several tens of megapascals to several tens of thousands of megapascals, and a load-deflection temperature of 150° C. or higher. Thus, these are preferred materials. About widely-used resin materials also, for example, polypropylene filled with a glass filler (GFPP) has an elastic modulus several times that of polypropylene filled with no filler (compression module: 1,000 to 1,500 MPa), and has a load-deflection temperature close to 150° C. Thus, the example can be preferably used. In the present embodiment, a glass filler added PPS (DIC-PPS FZ 1140-B2, manufactured by Dainippon Ink & Chemicals, Inc.), which is a thermoplastic resin, is used.

The gasket 7 is made of a thermoplastic resin and/or a thermoplastic elastomer. The thermoplastic resin or thermoplastic elastomer is chemically stable, and has such a heat resistance that, in particular, hydrolysis is not caused at the driving temperature of the PEFC 100. For example, the compression modulus of the gasket 7 is preferably 200 MPa or less. A preferred material of the gasket 7 is at least one selected from the group consisting of polyethylene, polypropylene (PP), ethylene-propylene-diene copolymer (EPDM: ethylene-propylene-diene methylene linkage), polybutylene, polystyrene, polyvinyl chloride, polyvinylidene chloride, polyvinyl alcohol, polyacrylamide, polyamide, polycarbonate, polyacetal, polyurethane, silicone, fluorine-contained resin, polybutylene terephthalate, polyethylene terephthalate, polyethylene naphthalate, syndiotactic polystyrene, polyphenylene sulfide, polyetheretherketone, polyetherketone, liquid crystal polymer, polyethernitrile, modified polyphenylene ether, polysulfone, polyethersulfone, polyarylate, polyamideimide, polyetherimide, thermoplastic polyimide, and others. The material(s) make(s) it possible to keep a good sealability certainly at the clamping load for the PEFC 100. In the first embodiment, a polyolefin based thermoplastic elastomer containing PP and EPDM, SANTOPRENE 8101-55 (manufactured by Advanced Elastomer System Co.) is used.

On the rear surfaces of the anode separator 2 and the cathode separator 3, ordinary sealing members 9, such as squeezed packings made of heat-resistant material, are arranged around the various manifold holes therein. According to this manner, between any adjacent ones 10 and 10 of the cells, the fuel gas, the oxidizer gas and the water are prevented from flowing out from joining portions of the various manifold holes 22, 23, 24, 32, 33 and 34.

Figure 4:
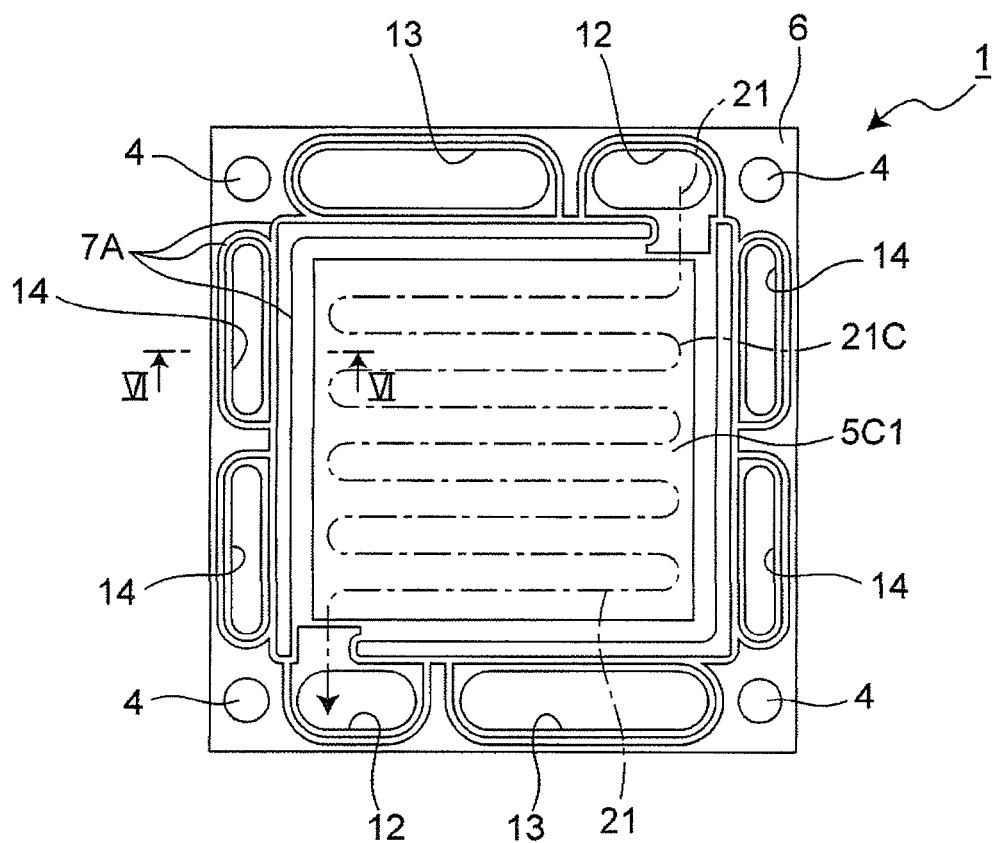
FIG. 4 is a plan view illustrating a surface structure of the MEA on an anode separator side thereof in FIG. 1.
Figure 5:
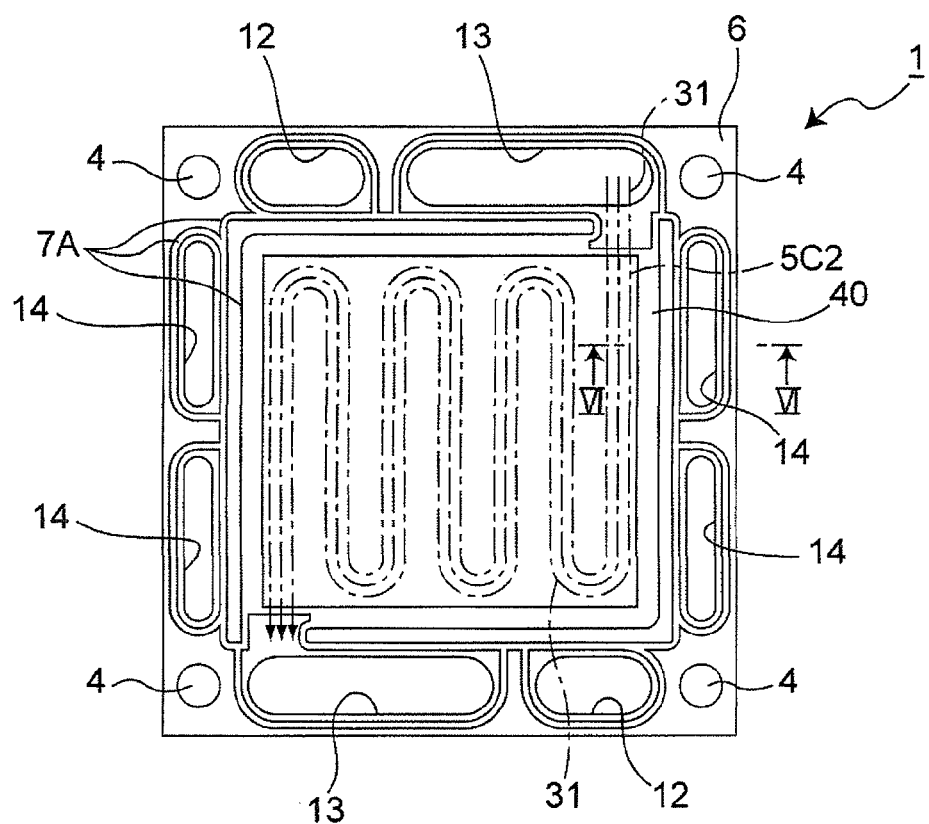
FIG. 5 is a plan view illustrating a surface structure of the MEA in FIG. 1 on a cathode separator side thereof.

FIG. 4 is a plan view illustrating a surface structure of the MEA on the anode separator side thereof in FIG. 1, and FIG. 5 is a plan view illustrating a surface structure of the MEA in FIG. 1 on the cathode separator side thereof. In both the figures, alternate long and short dash lines represent, in the state that the cell 10 is fabricated, positions which the fuel gas flow passage groove 21 of the anode separator 2 and the oxidizer gas flow passage groove 31 of the cathode separator 3 contact or face to face with each other.

As illustrated in FIG. 4 and FIG. 5, in the MEA 1 of the first embodiment, the frame 6 is set onto the circumferential region 5E of the MEA principal part 5, and the gasket 7 is set on both of the main surfaces of the frame 6.

The frame 6 is a rectangular and flat-plate form frame that sandwiches, between its portions, the polymer electrolyte membrane 5A of the MEA principal part 5 (see FIG. 2), and is further joined to the outer circumference of the polymer electrolyte membrane 5A. As described above, in the frame 6 are made the paired fuel gas manifold holes 12, the paired oxidizer gas manifold holes 13, the two-paired water manifold holes 14, and the four bolt holes 4 near the corners of the frame 6, so as to penetrate through the frame 6 in the thickness direction thereof. In the first embodiment, the frame 6 is formed in the form of a rectangular and flat-plate having an external form size of 20 mm×180 mm. The thickness of the frame 6 is 0.8 mm.

The gasket 7 is equipped with ringing regions 7A surrounding the paired fuel gas manifold holes 12, the paired oxidizer gas manifold holes 13, and the two-paired water manifold holes 14, and further surrounding the gas diffusion layers 5C1 and 5C2 of the MEA principal part 5. As illustrated in FIG. 4, on the anode separator 2 side, the ringing regions 7A are formed to surround the fuel gas manifold holes 12 and the MEA principal part 5 into a unified form. As illustrated in FIG. 5, on the cathode separator 3 side, the ringing regions 7A are formed to surround the oxidizer gas manifold holes 13 and the MEA principal part 5. This manner prevents the fuel gas and the oxidizer gas from flowing to the outside of the fuel gas flow passage groove 21 and the oxidizer gas flow passage groove 31. In this case, the ringing regions 7A of the gasket 7 cause the flow passage resistance against the connecting regions 21B of the fuel gas flow passage groove 21 and the connecting regions 31B of the oxidizer gas flow passage groove 31. However, the depth of the groove made in each of the separators 2 and 3 is sufficient; thus, the circulation of the fuel gas and the oxidizer gas is not hindered. In the state that the cell 10 is fabricated, at positions which the connecting regions 21B of the fuel gas flow passage groove 21 and the connecting regions 31B of the oxidizer gas flow passage groove 31 contact, the ringing regions 7A of the gasket 7 may not be arranged. In this case, the flow passage resistance against the connecting regions 21B of the fuel gas flow passage groove 21 and the connecting regions 31B of the oxidizer gas flow passage groove 31 can be further relieved.

As illustrated in FIG. 2, ribs 7B are formed in top surfaces of the ringing regions 7A of the gasket 7 to extend along the extending directions of the regions. In the state that the cell 10 is fabricated, the ribs 7B are brought into contact with the separators 2 and 3 to be crushed down. As a result thereof, the clamping force of the cell 10 concentrates into the regions of the ribs 7B so that the circumferences of the individual manifold holes 12, 13 and 14 and the MEA principal part 5 are sealed with a higher certainty. In short, the ribs 7B make it possible to attain the sealing of the gasket 7 with a higher certainty. This manner prevents the fluids flowing in the individual manifold holes 12, 13 and 14 from being leaked from the manifold holes 12, 13 and 14, so that the fluids come to have a high pressure.

It is preferred that the rib 7B positioned innermostly (on the gas diffusion layer 5C side) is positioned inside the outer circumference of the polymer electrolyte membrane 5A. According to such a structure, the ribs 7B and 7B opposed to each other sandwich the circumferential region 5E of the MEA principal part 5 therebetween by effect of the clamping force in the fabrication state of the cell 10, so as to interpose the frame 6 between the ribs 7B and 7B, thereby making it possible to strengthen an adhesion and a joining force between the circumferential region 5E of the MEA principal part 5 and the frame 6.

Groove regions 6A are made in regions of both the surfaces of the frame 6 where the frame 6 contacts the gasket 7. The gasket 7 is partially fitted into the groove regions 6A so as to be firmly fixed.

The following will describe a method for producing the MEA 1. FIG. 6A to FIG. 6D are schematic explanatory views illustrating, in a cross section on line VI-VI in each of FIGS. 4 and 5, individual steps for producing the MEA. FIG. 7A to FIG. 7D are schematic explanatory views wherein a joint region between an MEA principal part and a frame is enlarged and shown. FIG. 8A is a schematic sectional view illustrating a state that the MEA principal part is arranged onto a primary molded body constituting a portion of the frame, and FIG. 8B is a schematic sectional view illustrating a state that a secondary molded body constituting the other portion of the frame is molded subsequently to the state in FIG. 8A.

Figure 8A:
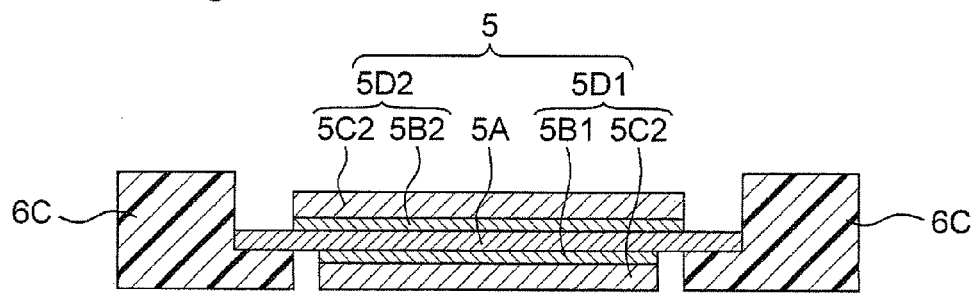
FIG. 8A is a schematic sectional view illustrating a state that the MEA principal part is arranged onto a primary molded body constituting a portion of the frame of the MEA related to the first embodiment of the invention.
Figure 8B:
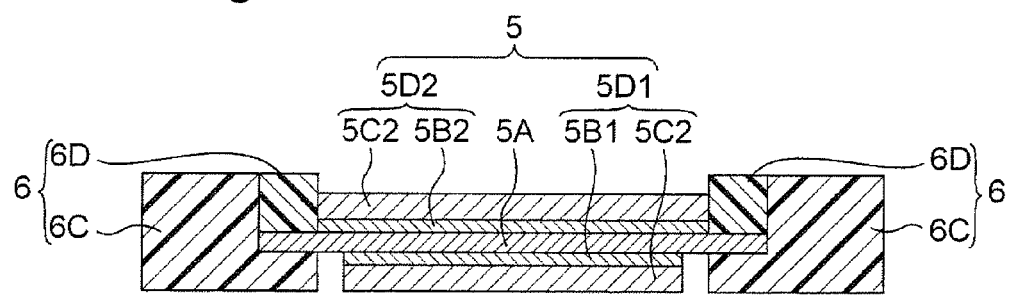
FIG. 8B is a schematic sectional view illustrating a state that a secondary molded body constituting the other portion of the frame of the MEA is molded subsequently to the state in FIG. 8A.
Figure 9A:
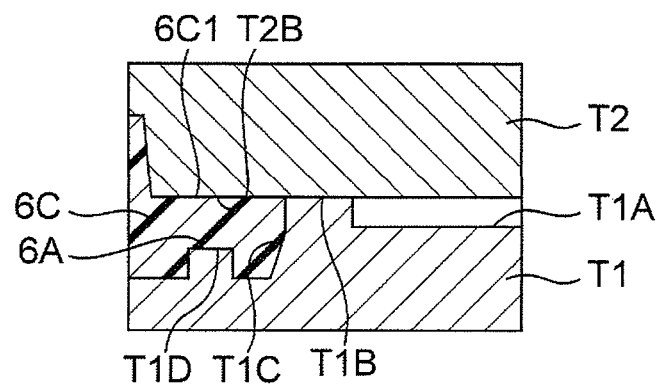
FIG. 9A is a schematic explanatory view illustrating a step for producing a first modified example of the MEA related to the first embodiment of the invention, wherein a joint region between an MEA principal part and a frame is enlarged and shown.
Figure 9B:
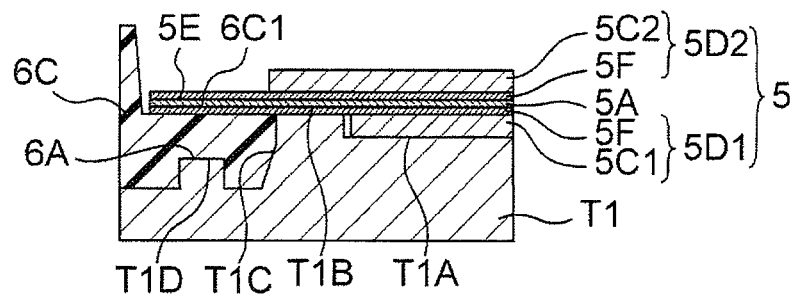
FIG. 9B is a schematic explanatory view illustrating a step subsequent to that in FIG. 9A.
Figure 9C:
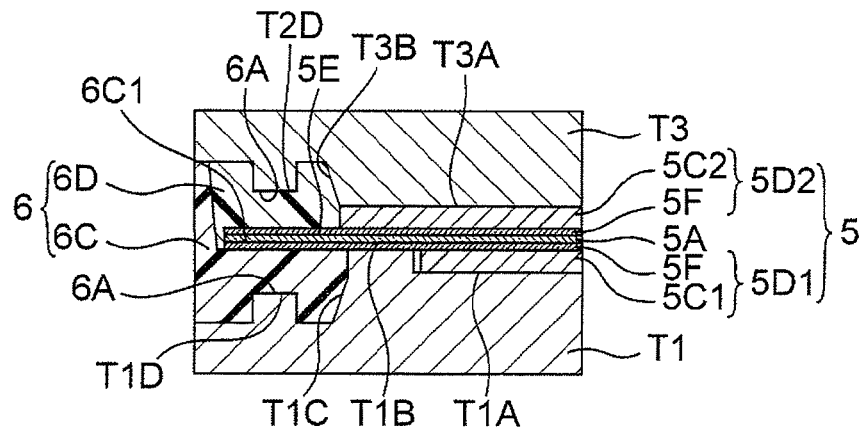
FIG. 9C is a schematic explanatory view illustrating a step subsequent to that in FIG. 9B.
Figure 9D:
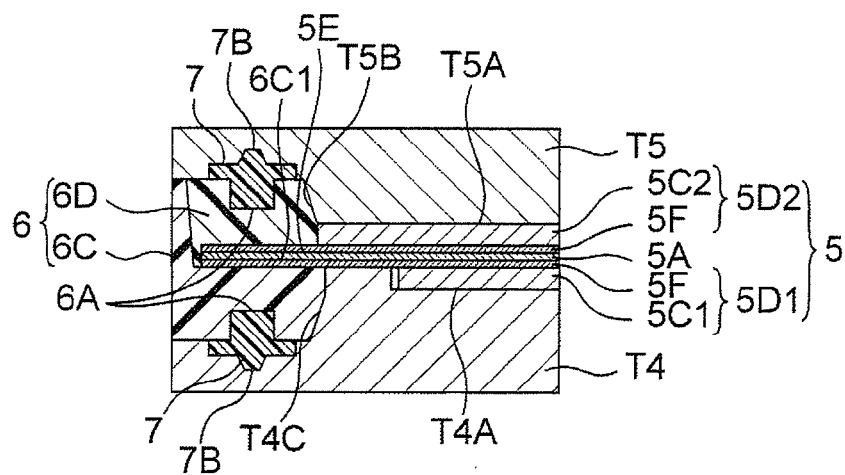
FIG. 9D is a schematic explanatory view illustrating a step subsequent to that in FIG. 9C.
Figure 10A:
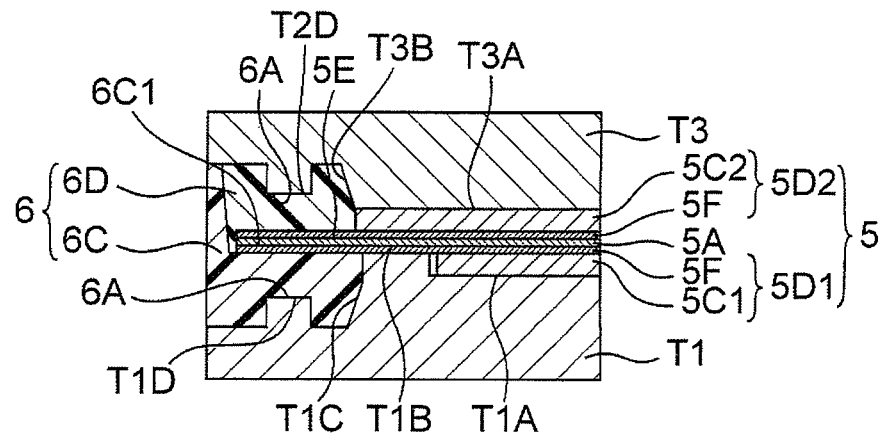
FIG. 10A is a schematic explanatory view illustrating a step for producing a second modified example of the MEA related to the first embodiment of the invention, wherein a joint region between an MEA principal part and a frame is enlarged and shown.
Figure 10B:
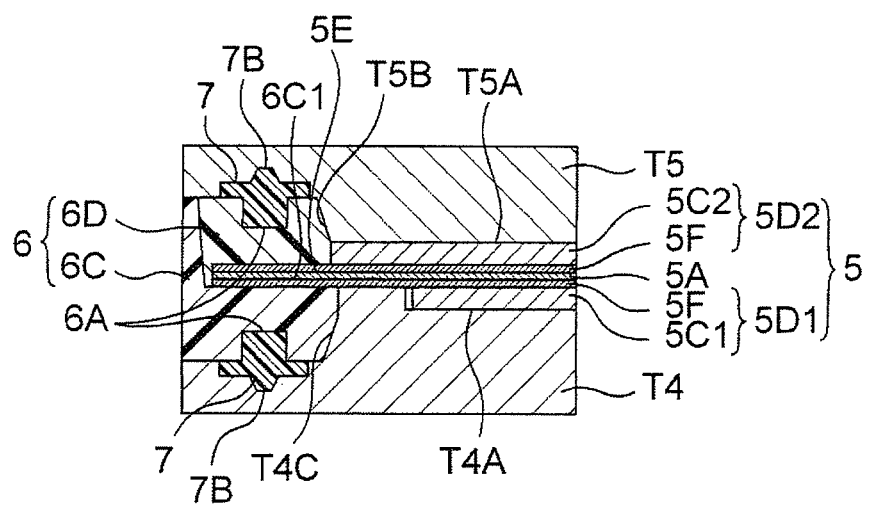
FIG. 10B is a schematic explanatory view illustrating a step subsequent to that in FIG. 10A.
Figure 10C:
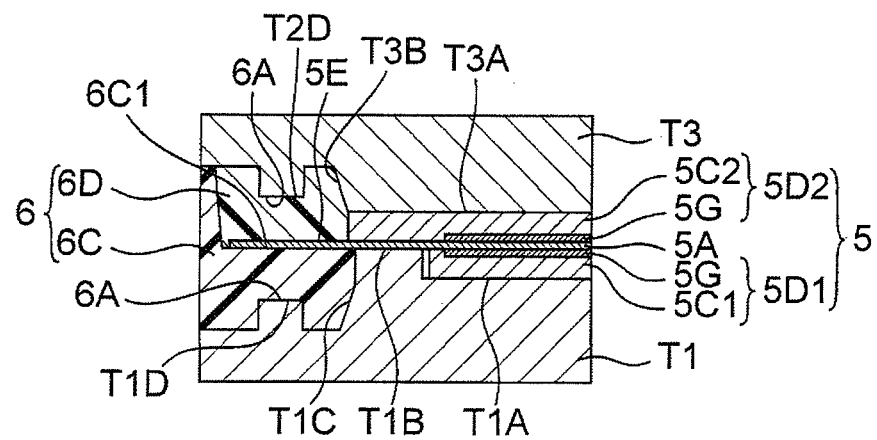
FIG. 10C is a schematic explanatory view illustrating a step subsequent to that in FIG. 10B.
Figure 10D:
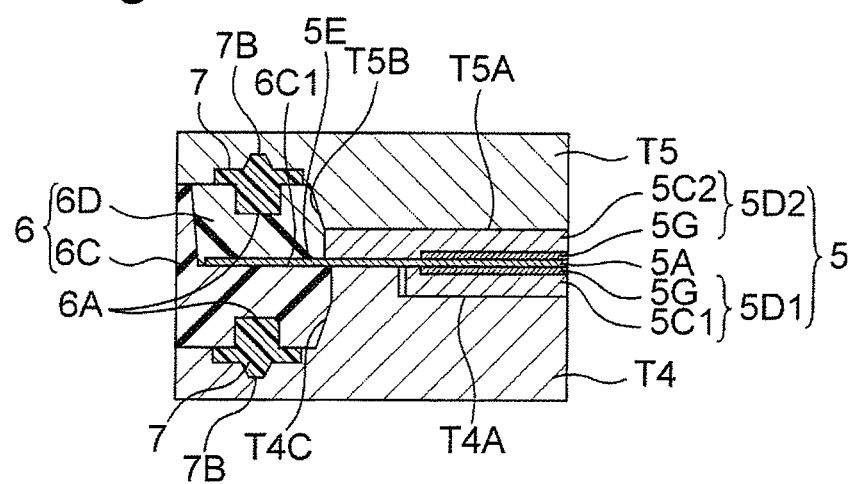
FIG. 10D is a schematic explanatory view illustrating a step subsequent to that in FIG. 10C.

As illustrated in FIGS. 8A and 8B, first, catalyst layers 5B1 and 5B2 are formed on both surfaces of the center of a polymer electrolyte membrane 5A, respectively, and further gas diffusion layers 5C1 and 5C2 are formed on the catalyst layers, respectively, to form an MEA principal part 5. At this time, the catalyst layer 5B1 and the gas diffusion layer 5C1, which constitute an anode electrode layer 5D1, are laid to be smaller in size than the catalyst layer 5B2 and the gas diffusion layer 5C2, which constitute a cathode electrode layer 5D2, and further to cause the outer circumference of the layers 5B1 and 5C1 to be positioned inside the layers 5B2 and 5C2.

The catalyst layers 5B1 and 5B2 are formed, for example, as follows:

Platinum is carried onto Ketjen Black EC (furnace black, manufactured by Ketjen Black International Co.; specific surface area: 800 $m^2$/g, DBP oil absorption: 360 mL/100 g) to give a ratio by weight of 1/1. Next, into 10 g of the catalyst powder are incorporated 35 g of water and 59 g of a liquid wherein a hydrogen-ion-conductive polymer electrolyte is dispersed in alcohol (9% FSS, manufactured by Asahi Glass Co., Ltd.), and then an ultrasonic stirrer is used to disperse the electrolyte therein, thereby producing a catalyst layer ink. This catalyst layer ink is applied into a thickness of 20 μm onto a cathode surface of the polymer electrolyte membrane 5A by spraying. Thereafter, the workpiece is thermally treated at 115° C. for 20 minutes to form the cathode side catalyst layer 5B2. In the spraying application, a mask having an opening, 120 mm×120 mm in size, is put onto the polymer electrolyte membrane 5A. In the same way as described above, the same catalyst layer ink is produced, and the ink is applied into a thickness of 20 μm onto an anode surface of the polymer electrolyte membrane 5A by spraying. Thereafter, the workpiece is thermally treated at 115° C. for 20 minutes to form the anode side catalyst layer 5B2. In the spraying application, a mask having an opening, 115 mm×115 mm in size, is put onto the polymer electrolyte membrane 5A. In this way, the anode side catalyst layer 5B2 smaller in size than the cathode side catalyst 5B2 is formed. The polymer electrolyte membrane 5A may be, for example, a perfluorocarbonsulfonic acid membrane (Nafion 117 (registered trade name) manufactured by Du Pont) having, for example, an external form 140 mm square and a thickness of 50 μm.

The gas diffusion layers 5C1 and 5C2 are each made of a porous body having many fine pores. When a fuel gas or an oxidizer gas enters the pores in the porous body, the gas diffuses to reach the catalyst layer 5B1 or 5B2 easily. In the first embodiment, the upper of the cathode side catalyst layer 5B1 and that of the anode side catalyst layer 5B2 are covered with, for example, carbon fiber cloths (Carbel Cl 400, manufactured by Japan Gore-Tex Co.; thickness: 400 μm) 120 mm square and a carbon fiber cloth 115 mm square, respectively. These carbon fiber clothes are hot-pressed at a pressure of 0.5 MPa and 135° C. for 5 minutes, thereby forming the gas diffusion layers 5C1 and 5C2 on the catalyst layers 5B1 and 5B2 on both main surfaces of the polymer electrolyte membrane 5A, respectively.

Next, a frame 6 is formed onto the circumferential region 5E of the MEA principal part 5.

In a first step, a primary molded body 6C, which is a portion of the frame 6, is first molded.

Figure 6A:
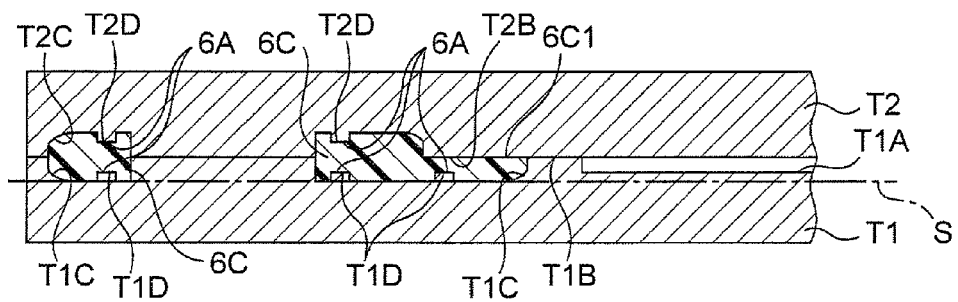
FIG. 6A is a schematic explanatory view illustrating, in a cross section on line VI-VI in each of FIGS. 4 and 5, a step for producing the MEA.
Figure 7A:
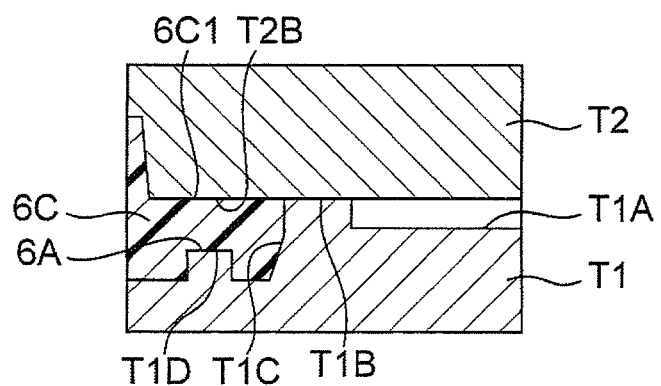
FIG. 7A is a schematic explanatory view illustrating a step for producing the MEA, wherein a joint region between an MEA principal part and a frame is enlarged and shown.

Specifically, as illustrated in FIGS. 6A and 7A, a first mold T1, which is an example of the first molding die, and a second mold T2 are clamped to each other, and then a thermoplastic resin for the frame 6 is caused to flow into the gap between the first mold T1 and the second mold T2 by injection or the like, so as to mold the primary molded body 6C in a rectangular frame form. At this time, in the frame inner-circumference of the primary molded body 6C, a flat region 6C1 is formed wherein the circumferential region 5E of the MEA principal part 5 is arranged.

The first mold T1 is formed so that its frame region T1C has a shape corresponding to the shape of the primary molded body 6C, that is, a lower half surface of the frame 6. In the region inside the frame region of the first mold T1, a flat region T1B is formed wherein the circumferential region 5E of the MEA principal part 5 can be arranged. In other words, the flat region T1B has a top surface extending from the frame inner-circumference side of the frame region T1C in substantially parallel to the primary molded body 6C, that is, a frame surface S of the frame 6. Furthermore, in the region inside the frame region of the first mold T1, a depression T1A is made wherein the MEA principal part 5 can be held and arranged into a flat plane form. In other words, the depression T1A has a spread which is extended by several millimeters from the outer circumference of the gas diffusion layer 5C in the region inside the frame region of the first mold T1, the region being constituted by extending the top surface of the flat region T1B, and the bottom of the depression is a flat surface so as to give a depth equivalent to the thickness of the catalyst layer 5B and the gas diffusion layer 5C of the MEA principal part 5 when the top surface of the flat region T1B is considered as the base level of the depth.

The second mold T2 is formed so that its frame region T2C can mold the primary molded body 6C, that is, the upper half surface of the frame 6. However, in the frame inner-circumferential region of the second mold T2, a flat region T2B is formed so that the flat region 6C1, where the circumferential region 5E of the MEA principal part 5 can be arranged into a flat plane form, can be formed in the primary molded body 6C. In other words, the flat region T2B has a top surface contacting the top surface of the flat region T1B of the first mold T1 and extending toward the frame outer circumference to give a spread not less than the spread of the circumferential region 5E of the MEA principal part 5. In the second mod T2, charging-ports (not illustrated) are made for pouring a resin which is to constitute the primary molded body 6C into the molds. Correspondingly to each of the sides of the rectangular frame form primary molded body 6C, about four ports out of the charging-ports are made at a pitch of 40 mm.

Convex regions T1D and T2D are formed in the frame regions T1C and T2C, respectively, at positions where a gasket 7 is to be arranged, that is, at positions where the frame regions TC1 and TC2 surround the manifold holes 12, 13 and 14 and further surround the frame-inside of the frame 6. About a cross sections of the convex regions T1D and T2D, the depth and the width thereof are set to about 0.5 mm, and about 0.5 mm, respectively. In this way, grooves 6A are made in the primary molded body 6C. It is allowable to form the frame regions T1C and T2C not to have the convex region T1D nor T2D, and then make the groove regions 6A by cutting work after the frame 6 is completed.

The frame regions T1C and T2C each have a shape permitting the manifold holes 12, 13 and 14 to be made. Accordingly, the manifold holes 12, 13 and 14 are made when the primary molded body 6 is molded. It is allowable to form the frame regions T1C and T2C not to have the manifold holes 12, 13 nor 14, and then make the manifold holes 12, 13 and 14 by cutting work or punching-out work.

Figure 6B:
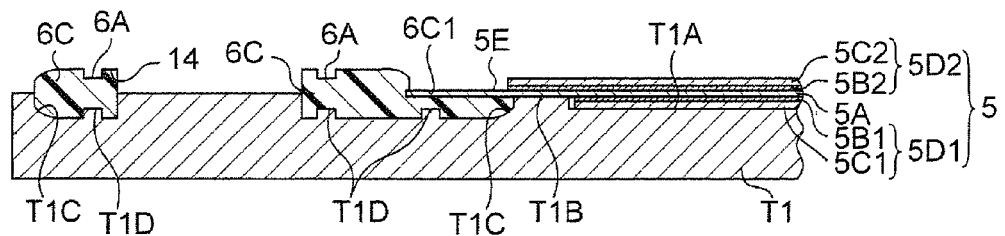
FIG. 6B is a schematic explanatory view illustrating a step subsequent to that in FIG. 6A.
Figure 6C:
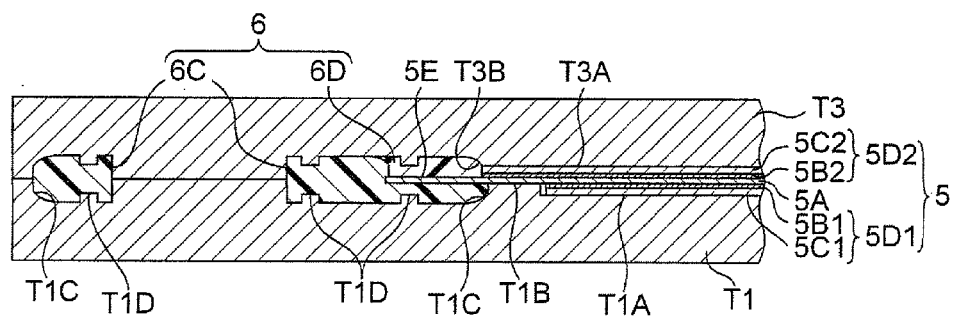
FIG. 6C is a schematic explanatory view illustrating a step subsequent to that in FIG. 6B.
Figure 6D:
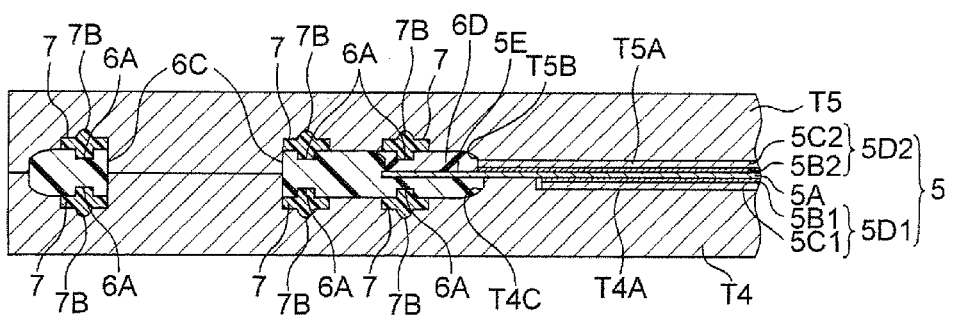
FIG. 6D is a schematic explanatory view illustrating a step subsequent to that in FIG. 6C.
Figure 7B:
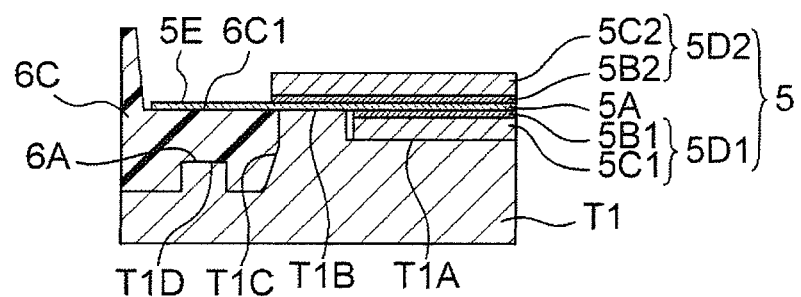
FIG. 7B is a schematic explanatory view illustrating a step subsequent to that in FIG. 7A.
Figure 7C:
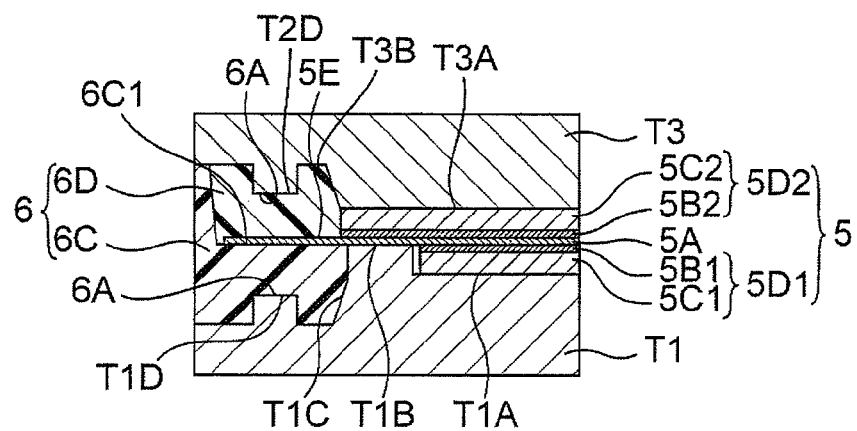
FIG. 7C is a schematic explanatory view illustrating a step subsequent to that in FIG. 7B.
Figure 7D:
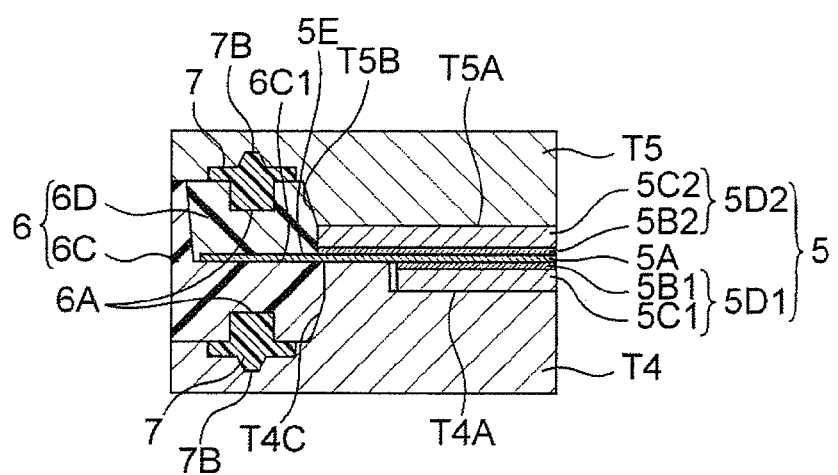
FIG. 7D is a schematic explanatory view illustrating a step subsequent to that in FIG. 7C.

Next, as illustrated in FIG. 6B and FIG. 7B, in a second step, the second mold T2 is removed away from the primary molded body 6C, and then the MEA principal part 5 is arranged into a flat plane form inside the frame of the primary molded body 6C fitted into the first mold T1, and further the circumferential region 5E of the MEA principal part 5 is arranged onto the flat region 6C1 of the primary molded body 6C.

More specifically, the MEA is arranged to position the polymer electrolyte membrane 5A extending the circumferential region 5E of the MEA principal part 5 on the flat region 6C1 of the primary molded body 6C, position the anode electrode layer 5D1 in the depression T1A in the first mold T1, and further position the cathode electrode layer 5D2 onto the top surface of the flat region T1B of the first mold T1 to interpose the polymer electrolyte membrane 5A between the layer 5D2 and the top surface. In this way, the MEA principal part 5 is arranged into a flat plane form as illustrated in FIG. 8A. At this time, as illustrated in FIG. 6B and FIG. 7B, the outer circumference of the cathode electrode layer 5D2 is positioned outside the frame inner-circumference of the primary molded body 6C in the plane direction of the MEA principal part 5. In short, the cathode electrode layer 5D2 and a portion of the flat region 6C1 of the primary molded body 6c are arranged to be opposed to each other. This manner does not give any region where the polymer electrolyte membrane 5A is alone present without having any supporting member, that is, any region where the membrane 5A is not supported by the electrode layers 5D1 or 5D2, nor the primary molded body 6.

Next, in a third step, the frame 6 to which the MEA principal part 5 is joined is formed.

More specifically, a third mold T3, which is an example of the second molding die, is clamped to the first mold T1, to which the primary molded body 6C wherein the MEA principal part 5 is arranged is fitted. In same manner as in the first mold T1, in the third mold T3 a depression T3A is made at a position where the mold T3 interferes with the gas diffusion layer 5C2 so as not to interfere with the gas diffusion layer 5C2 and the third mold T3 with each other. In this way, in the third step, the third mold T3 and the MEA principal part 5 do not interfere with each other so that the MEA principal part 5 can be prevented from being damaged.

After the first mold T1 and the third mold are joined to each other, a thermoplastic resin which is to constitute the frame 6 is caused to flow into between the molds by injection or the like, thereby molding a secondary molded body 6D. In this way, the frame 6, wherein the primary molded body 6C and the secondary molded body 6D are integrated with each other, is molded as illustrated in FIG. 8B.

The third mold T3 is formed so that its frame region T3B is made into the shape of the upper half surface of the frame 6. In other words, the secondary molded body 6D is molded in the gap made between the frame region T3B of the third mold T3 and the primary molded body 6C. In third mold 13, charging-ports (not illustrated) are made for pouring a resin which is to constitute the secondary molded body 6D into the molds. Correspondingly to each of the sides of the rectangular frame form secondary molded body 6C, about two ports out of the charging-ports are made at a pitch of 80 mm. The third mold T3 is formed so that the frame region T3B and the depression T3A are continuously connected to each other in the state that the mold T3 and the first mold T1 are clamped to each other.

Accordingly, when the secondary molded body 6D is molded, a resin which is to constitute the secondary molded body 6D partially flows into an outer circumferential portion of the cathode side gas diffusion layer 5C2, which is a porous body, so that they are present to be intermixed with each other. In this manner, the secondary molded body 6D and the cathode side gas diffusion layer 5C2 are strongly fixed to each other. In order to strengthen the joint between the frame 6 and the MEA principal part 5, the width of the region where the resin constituting the frame 6 is intermixed with the outer circumferential portion of the cathode electrode layer 5D2 is preferably from about 5 to 10 mm. The width of the region where the resin constituting the frame 6 is intermixed with the outer circumferential portion of the cathode electrode layer 5D2 depends mainly on the viscosity of the resin. Specifically, when the viscosity of the resin is made low, the width can be made large. When the viscosity of the resin is made high, the width can be made small. The adjustment of the width may also be attained by the injection pressure of the resin.

When the secondary molded body 6D is molded, the polymer electrolyte membrane 5A is supported by at least one of the primary molded body 6C and the cathode side gas diffusion layer 5C2. Accordingly, the polymer electrolyte membrane 5A is prevented from being broken, and further the polymer electrolyte membrane 5A is prevented from being deformed as in third conventional example (see FIG. 19).

Next, in a fourth step, a gasket 7 is formed on the surface of the frame 6, to which the MEA principal part 5 is joined.

More specifically, the frame 6, to which the MEA principal part 5 is joined, is taken out from the first mold T1 and the third mold T3, and then arranged between a fourth mold T4 and a fifth mold T5. In this state, the fourth mold T4 and the fifth mold T6 are clamped to each other. Thereafter, a thermoplastic resin or thermoplastic elastomer which is to constitute the gasket 7 is caused to flow into a gap between the fourth mold T4 and the frame 6, and a gap between the fifth mold T5 and the frame 6 by injection or the like. In this way, the gasket 7 is molded onto the surface of the frame 6.

In the fourth mold T4, a depression T3A equivalent to the depression T1A in the first mold T1 is made. In the fifth mold T5, a depression T5A equivalent to the depression T3A in the third mold T3 is made. The fourth mold T4 is formed so that its frame region T4C is made into the shape of the lower half surface of the MEA 1. The fifth mold T5 is formed so that its frame region T5B is made into the shape of the upper half surface of the MEA 1. In short, the gasket 7 is molded in the gap made between the frame region T4B of the fourth mold T4 and the frame 6. As described above, the MEA 1 is produced.

According to the method for producing the MEA related to the first embodiment, the MEA principal part 5 is formed to cause the outer circumference of the cathode electrode layer 5D2 to be positioned outside the outer circumference of the anode electrode layer 5D1 in the plane direction of the MEA principal part 5. Moreover, in such a manner that the outer circumferential portion of the cathode electrode layer 5D2 is opposed to the flat region 6C1 of the primary molded body 6C, the MEA principal part 4 is arranged, and then the secondary molded body 6D is molded. In this way, at the time of molding the secondary molded body 6D, the polymer electrolyte membrane 5A is supported by either the flat region 6C1 of the primary molded body 6C or the outer circumferential portion of the cathode electrode layer 5D2. Thus, the breaking and the deformation of the polymer electrolyte membrane 5A can be prevented without raising the precision of the molds or controlling the resin pressures strictly. Additionally, in order to prevent the breaking and the deformation of the polymer electrolyte membrane 5A, it is unnecessary to set up a reinforcing membrane separately as in second conventional example; thus, as compared with conventional examples 1 to 3, the embodiment neither causes an increase in the number of components nor steps for the production.

When the frame 6 is molded, the resin which is to constitute the frame 6 is caused to flow into the outer circumferential portion of the cathode electrode layer 5D2, whereby the resin is caused to be present to be intermixed with the region; thus, the joining strength between the frame 6 and the MEA principal part 5 can be made large.

The first mold T1 can be used commonly to the steps from the first step to the third step; thus, by the use of slide molds or rotary molds, the first to third steps can be continuously performed inside a single molding machine. Accordingly, a mass productivity of MEAs 1 can be made high.

The invention is not limited to the embodiment, and may be carried out according to various other embodiments. In the above description, for example, the catalyst layers 5B1 and 5B2 are formed on both surfaces of the polymer electrolyte membrane 5A, respectively, and then the gas diffusion layers 5C1 and 5C2 are formed on the catalyst layers 5B1 and 5B2, respectively; however, the invention is not limited to this manner. For example, it is allowable to form the catalyst layers 5B1 and 5B2 in advance on the gas diffusion layers 5C1 and 5C2, respectively, and then arrange the resultants onto both the surfaces of the polymer electrolyte membrane 5A, respectively. It is sufficient for this case that the catalyst layers 5B1 and 5B2 are formed onto the entire surfaces of the gas diffusion layers 5C1 and 5C2, respectively. Thus, the catalyst layers 5B1 and 5B2 are more easily formed than in the case of forming the catalyst layers 5B1 and 5B2 onto both the surfaces of the polymer electrolyte membrane 5A, respectively, so as to match with the shapes of the gas diffusion layers 5C1 and 5C2.

In the above description, the catalyst layers 5B1 and 5B2 are formed to have the same sizes as the gas diffusion layers 5C1 and 5C2, respectively. However, the invention is not limited to this manner. For example, as illustrated in FIG. 9A to FIG. 9D, catalyst layers 5F and 5F may have the same size as the polymer electrolyte membrane 5A. It is sufficient for this case also that the catalyst layers 5B1 and 5B2 are formed on the entire surfaces of the polymer electrolyte membrane 5A; thus, the catalyst layers 5B1 and 5B2 are more easily formed than in the case of forming the catalyst layers 5B1 and 5B2 beforehand on partial regions of the polymer electrolyte membrane 5A, respectively. As illustrated in FIG. 10A to FIG. 10D, the catalyst layers 5G and 5G may be formed to have smaller sizes than the gas diffusion layers 5C1 and 5C2.

In the above description, the anode electrode layer 5D1 is formed to have a smaller size than the cathode electrode layer 5D2, whereby the position of the outer circumference of the cathode electrode layer 5D2 is located outside that of the outer circumference of the anode electrode layer 5D1; however, the invention is not limited to this manner. For example, the cathode electrode layer 5D2 may be formed to have a smaller size than the anode electrode layer 5D1. That is to say, it is sufficient for the invention that the position of the outer circumference of one of the electrode layers is located outside the outer circumference of the other electrode layers. In other words, it is sufficient therefor that the position of the outer circumference of the anode electrodes layer 5D1 is different from that of the outer circumference of the cathode electrode layer 5D2.

Second Embodiment

The following will describe an MEA related to a second embodiment of the invention. FIG. 11A to 11D are schematic explanatory views illustrating steps for producing the MEA related to the second embodiment of the invention, wherein a joint region between an MEA principal part and a frame is enlarged and shown. FIG. 12 is a schematic sectional view of the MEA related to the second embodiment of the invention.

When the MEA 1 related to the first embodiment is used to constitute any one of the cells 10, gaps 40 are made, as illustrated in FIG. 2, between: a vicinity of the joint region between the frame 6 of the MEA 1 and the MEA principal part 5; and the separators 2 and 3. A fuel gas and an oxidizer gas undergo an electrochemical reaction mainly between the electrode layers 5D1 and 5D2 opposed to each other; however, it is feared that the gaps 40 become a passage for a shortcut so that the fuel gas and the oxidizer gas do not pass between the electrode layers 5D1 and 5D2.

Therefore, in the MEA related to the second embodiment, the MEA is formed to have extending regions 7C1 and 7C2 extending from a gasket 7 so as to stuff gaps 40 (see FIG. 12).

The following will describe a method for producing the MEA related to the second embodiment.

Figure 11A:
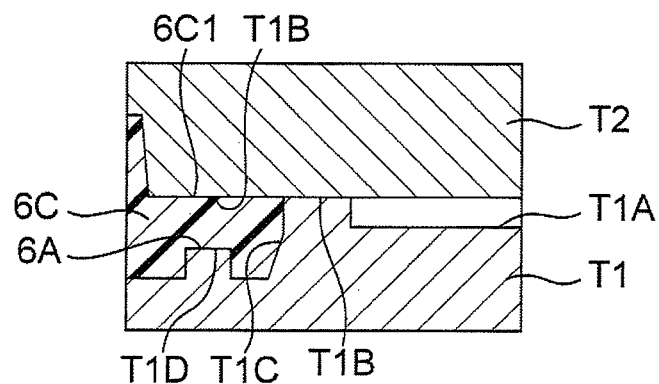
FIG. 11A is a schematic explanatory view illustrating a step for producing an MEA related to a second embodiment of the invention, wherein a joint region between an MEA principal part and a frame is enlarged and shown.
Figure 11B:
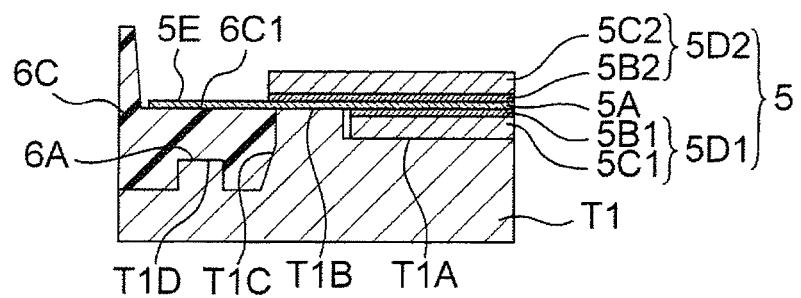
FIG. 11B is a schematic explanatory view illustrating a step subsequent to that in FIG. 11A.
Figure 11C:
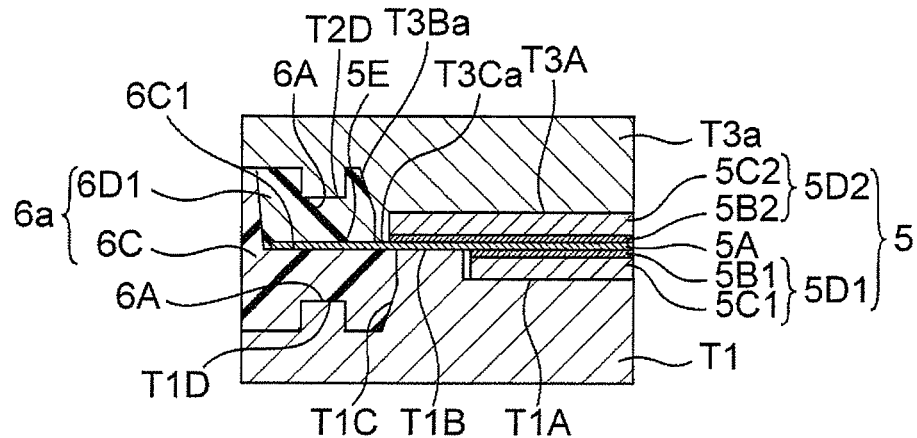
FIG. 11C is a schematic explanatory view illustrating a step subsequent to that in FIG. 11B.
Figure 12:
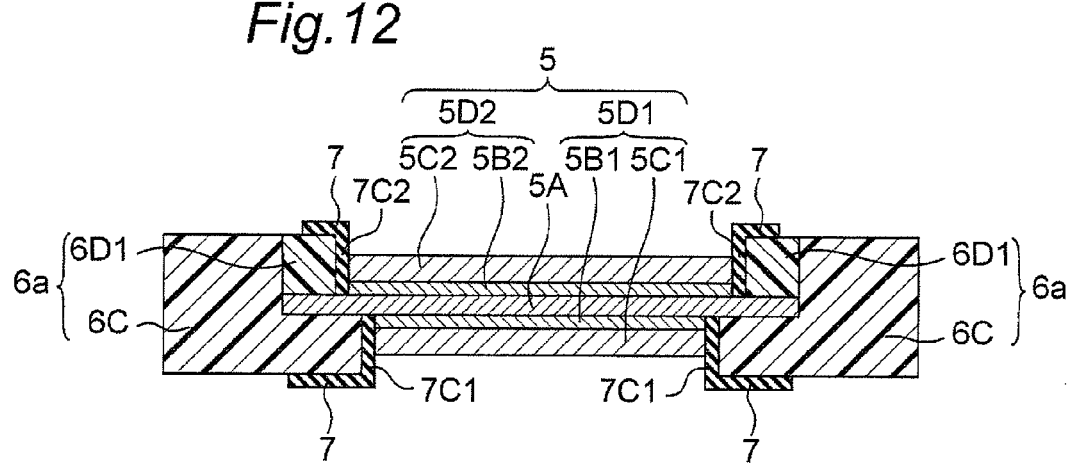
FIG. 12 is a schematic sectional view of the MEA related to the second embodiment of the invention.

In the same way as in the first embodiment, a primary molded body 6C is first molded as illustrated in FIG. 11A. As illustrated in FIG. 11B, an MEA principal part 5 is then arranged in a depression T1A in a first mold T1. Thereafter, as illustrated in FIG. 11C, a third mold T3 and the first mold T1 are clamped to each other to mold a secondary molded body 6D1.

The third mold T3a is formed so that its frame region T3Ba is made into the shape of the upper half surface of a frame 6a. In other words, the secondary molded body 6D1 is formed in a gap made between the frame region T3Ba of the third mold T3 and the primary molded body 6C. The third mold T3a has a flat region T3Ca positioned between the secondary molded body 6D1 and a cathode electrode layer 5D2 and contacting a polymer electrolyte membrane 5A in the state that the third mold T3a and the first mold T1 are clamped to each other. The flat region T3Ca is formed so that its top surface is opposed to a flat region 6C1 of the primary molded body 6C to interpose the polymer electrolyte membrane 5A therebetween, and is not opposed to a flat region T1B of the first mold T1.

Figure 11D:
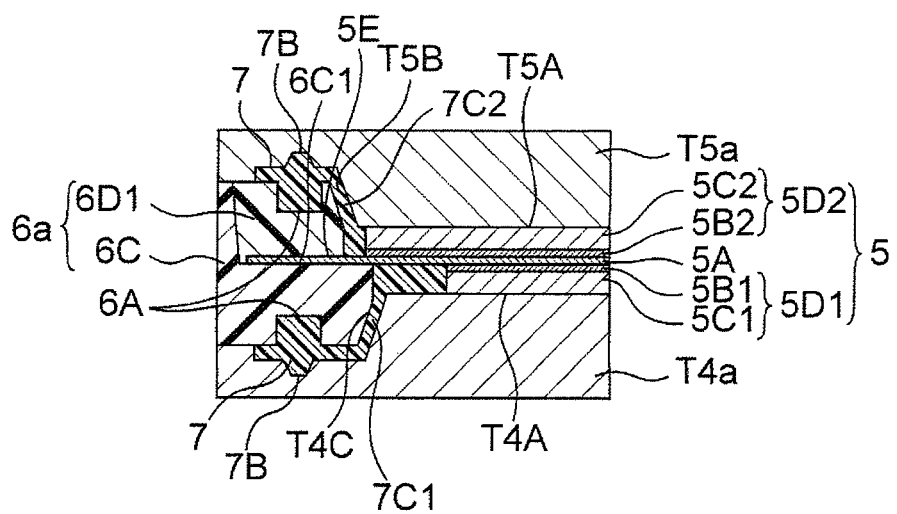
FIG. 11D is a schematic explanatory view illustrating a step subsequent to that in FIG. 11C.

As illustrated in FIG. 11D, after the molding of the secondary molded body 6D1, the frame 6a, to which the MEA principal part 5 is joined, is arranged between a fourth mold T4a, which is an example of the third molding die, and a fifth mold T5a, which is an example of the fourth molding die. Thereafter, the fourth mold T4a and the fifth mold T5a are clamped to each other to mold a gasket 7 and extending regions 7C1 and 7C2 on the frame 6a (see FIG. 12).

At this time, the extending regions 7C1 and 7C2 are molded in a gap between the frame 6a, and electrode layers 5D1 and 5D2, the gap being formed by the flat region T1B of the first mold T1 and the flat region T3Ca of the third mold T3a. Furthermore, at this time, a thermoplastic resin or thermoplastic elastomer which is to constitute the extending regions 7C1 and 7C2 partially flows into outer circumferential portions of gas diffusion layers 5C1 and 5C2, which are each a porous body, so that they are present to be intermixed with each other. In this manner, the extending regions 7C1 and 7C2 are strongly fixed to the gas diffusion layers 5C1 and 5C2, respectively, According to the MEA related to the second embodiment of the invention, the extending regions 7C1 and 7C2 extending from the gasket 7 are located to stuff the gaps 40, thereby making it possible to restrain the problem of the shortcut for the fuel gas and the oxidizer gas.

Moreover, the flat region T1B of the first mold T1 and the flat region T3Ca of the third mold are formed not to be opposed to each other; thus, the extending regions 7C1 and 7C2 molded in the gaps made by the flat regions T1B and T3Ca are not opposed to each other. In other words, the injection pressures of the thermoplastic resins or thermoplastic elastomers constituting the extending regions 7C1 and 7C2 are not applied to the same portion. Moreover, the polymer electrolyte membrane 5A is supported by either the flat region 6C1 of the primary molded body 6C or the cathode electron layer 5D2. This manner makes it possible to prevent the breaking and the deformation of the polymer electrolyte membrane 5A without raising the precision of the molds or controlling the resin pressures strictly. Additionally, as compared with conventional examples 1 to 3, the MEA related to the second embodiment of the invention neither causes an increase in the number of components nor steps for the production.

Third Embodiment

The following will describe an MEA related to a third embodiment of the invention. The MEA related to the third embodiment of the invention is different only in the structure of its MEA principal part from the MEA related to the first embodiment. The MEA is equal in the others to the MEA related to the first embodiment; thus, overlapping descriptions thereof are omitted.

Figure 13:
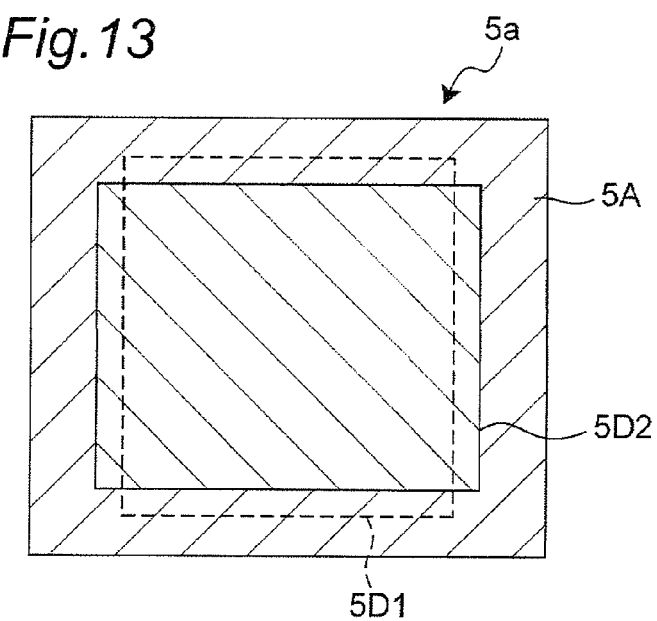
FIG. 13 is a plan view of an MEA principal part of an MEA related to a third embodiment of the invention.

FIG. 13 is a plan view of the MEA principal part, which the MEA related to the third embodiment of the invention has. As illustrated in FIG. 13, an MEA principal part 5a has a structure wherein a rectangular anode electrode layer 5D1 and a rectangular cathode electrode layer 5D2 are arranged to cross their long sides (or short sides) with each other (for example, perpendicularly) so that the layers have overhanging portions, where the layers are not opposed to each other. In other words, the cathode electrode layer 5D2 is arranged so that its long sides cross paired long sides of the anode electrode layer 5D1, respectively. In this manner, the position of the outer circumference of the anode electrode layer 5D1 is made different from that of the outer circumference of the cathode electrode layer 5D2.

According to the third embodiment of the invention, at the time of molding a secondary molded body 6D1, the polymer electrolyte membrane 5A can be supported by either a flat region 6C1 of a primary molded body 6C, the anode electrode layer 5D1 or the cathode electrode layer 5D2. Accordingly, the breaking and the deformation of the polymer electrolyte membrane 5A can be prevented without raising the precision of the molds or controlling the resin pressures strictly. Additionally, the arrangement of the electrode layers 5D1 and 5D2 is merely changed; thus, as compared with conventional examples 1 to 3, the embodiment neither causes an increase in the number of components nor steps for the production.

Fourth Embodiment

The following will describe an MEA related to a fourth embodiment of the invention. The MEA related to the fourth embodiment of the invention is different only in the structure of its MEA principal part from the MEA related to the second embodiment. The MEA is equal in the others to the MEA related to the second embodiment; thus, overlapping descriptions thereof are omitted.

Figure 14A:
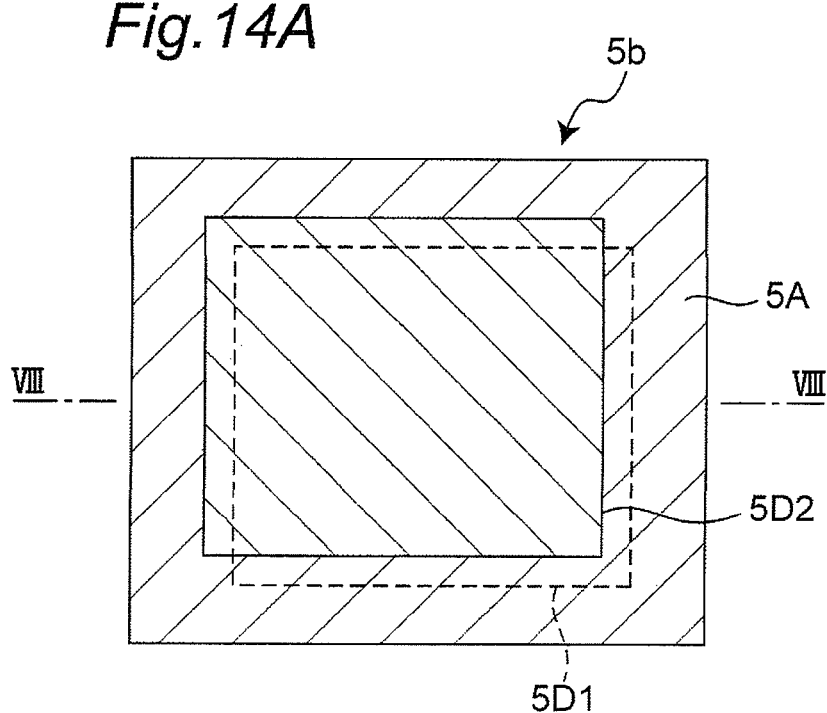
FIG. 14A is a plan view of an MEA principal part of an MEA related to a fourth embodiment of the invention.
Figure 14B:
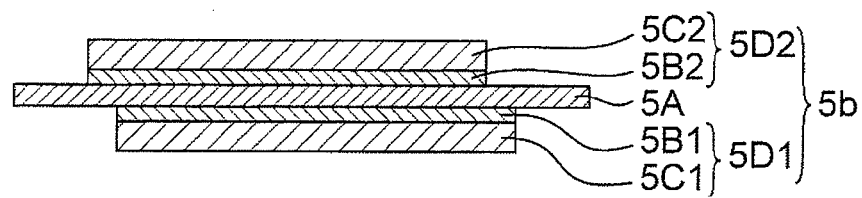
FIG. 14B is a sectional view on line VIII-VIII in FIG. 14A.

FIG. 14A is a plan view of the MEA principal part, which the MEA related to the fourth embodiment of the invention has, and FIG. 14B is a sectional view on line VIII-VIII in FIG. 14A.

As illustrated in FIG. 14A and FIG. 14B, in the fourth embodiment, an anode electrode layer 5D1 and a cathode electrode layer 5D2 which have the same size are arranged to be deviated, obliquely in the plane direction of a polymer electrolyte membrane 5A, from each other while the layers 5D1 and 5D2 have an overlapping region in the thickness direction of the polymer electrolyte membrane 5A. In this manner, the position of the outer circumference of the anode electrode layer 5D1 is made different from that of the outer circumference of the cathode electrode layer 5D2.

Figure 15A:
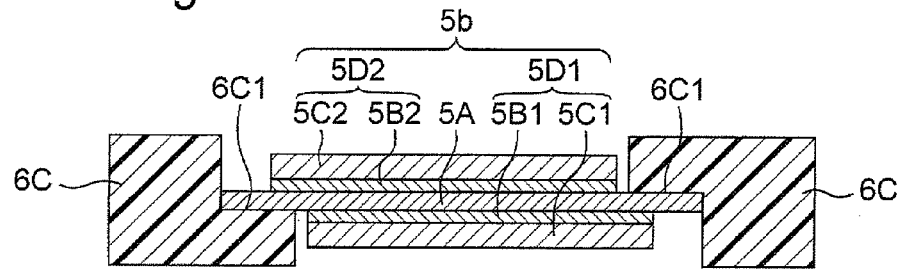
FIG. 15A is a schematic sectional view illustrating a state that the MEA principal part is arranged onto a primary molded body constituting a portion of the frame of the MEA related to the fourth embodiment of the invention.
Figure 15B:
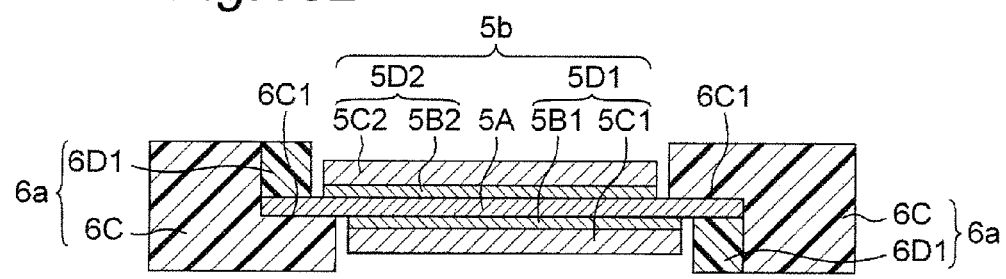
FIG. 15B is a schematic sectional view illustrating a state that a secondary molded body constituting the other portion of the frame of the MEA is molded subsequently to the state in FIG. 15A.
Figure 15C:
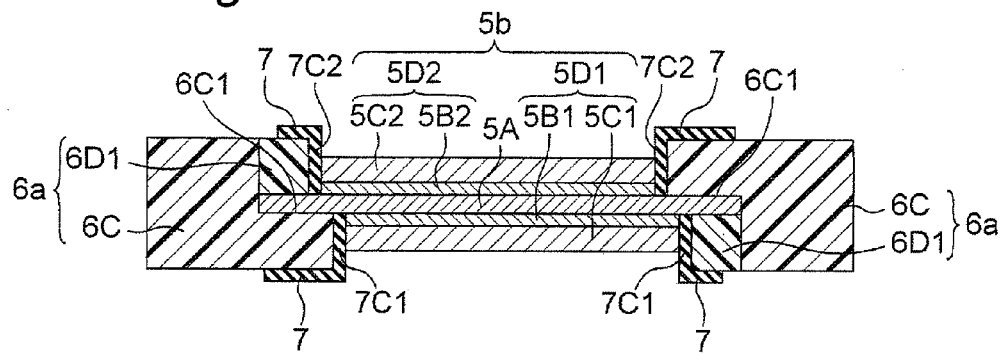
FIG. 15C is a schematic sectional view illustrating a state that a gasket is arranged subsequently to the state in FIG. 15B.

FIG. 15A to FIG. 15C are schematic sectional views illustrating steps for molding a frame onto the MEA principal part.

As illustrated in FIG. 15A, in the fourth embodiment, a rectangular frame form primary molded body 6C is molded to cause flat regions 6C1 and 6C1 located in opposite-side regions of the primary molded body 6C to be faced reversely to each other. In other words, the primary molded body 6C is molded so that one of the flat regions 6C1 can support one of both surfaces inside the circumferential region of the polymer electrolyte membrane 5A and the other flat region 6C1 can support the other surface inside the circumferential region of the polymer electrolyte membrane 5A. The circumferential region of the polymer electrolyte membrane 5A is arranged onto the flat regions 6C1 and 6C1 of the primary molded body 6C molded as described above. At this time, an outer circumferential portion of the anode electrode layer 5D1 is opposed to one of the flat regions 6C1 while an outer circumferential portion of the cathode electrode layer 5D2 is opposed to the other flat region 6C1. Thereafter, in the same way as in the second embodiment, a secondary molded body 6D1 is molded as illustrated in FIG. 15B, and then a gasket 7 and extending portions 7C1 and 7C2 are molded, as illustrated in FIG. 15C.

According to the fourth embodiment, in the same manner as in the first to third embodiments, the breaking and the deformation of the polymer electrolyte membrane 5A can be prevented without raising the precision of the molds or controlling the resin pressures strictly. Additionally, the arrangement of the electrode layers 5D1 and 5D2 is merely changed; thus, as compared with conventional examples 1 to 3, the embodiment neither causes an increase in the number of components nor steps for the production.

Furthermore, according to the fourth embodiment, the anode electrode layer 5D1 and the cathode electrode layer 5D2 are made into the same size; therefore, the formation of the electrode layers 5D1 and 5D2 can be attained by means of press molds of a single kind. Thus, the production costs can be decreased.

Fifth Embodiment

The following will describe an MEA related to a fifth embodiment of the invention. About the MEA related to the fifth embodiment of the invention, in the process for producing the MEA, a pushing member is used for preventing a raising or peeling of a polymer electrolyte membrane 5A. In this point, the MEA is different from the MEA related to the second embodiment. The MEA is equal in the others to the MEA related to the second embodiment; thus, overlapping descriptions thereof are omitted while a description will be made mainly about the difference.

FIG. 16A to FIG. 16D are schematic explanatory views illustrating steps for producing the MEA related to the fifth embodiment of the invention, wherein a joint region between an MEA principal part and a frame is enlarged and shown. FIG. 17 is a perspective view of the pushing member for preventing the polymer electrolyte membrane from being raised or peeled. Hereinafter, a description will be made about a process for producing the MEA related to the fifth embodiment of the invention.

Figure 16A:
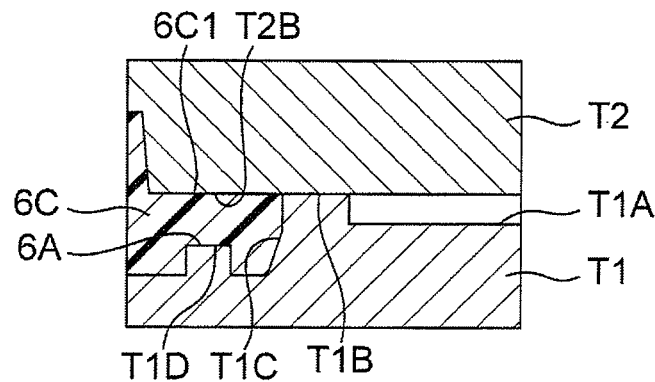
FIG. 16A is a schematic explanatory view illustrating a step for producing an MEA related to a fifth embodiment of the invention, wherein a joint region between an MEA principal part and a frame is enlarged and shown.
Figure 16B:
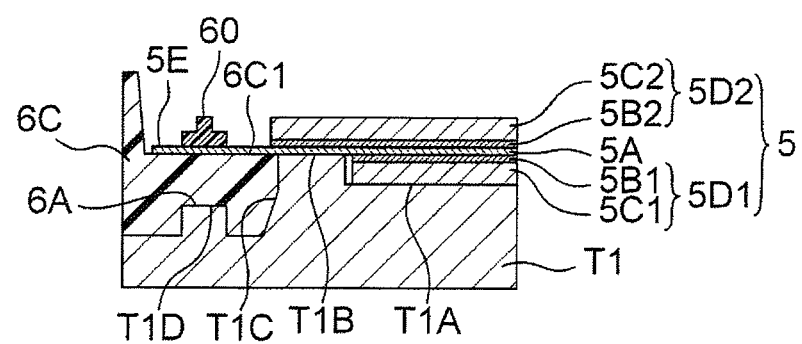
FIG. 16B is a schematic explanatory view illustrating a step subsequent to that in FIG. 16A.
Figure 16C:
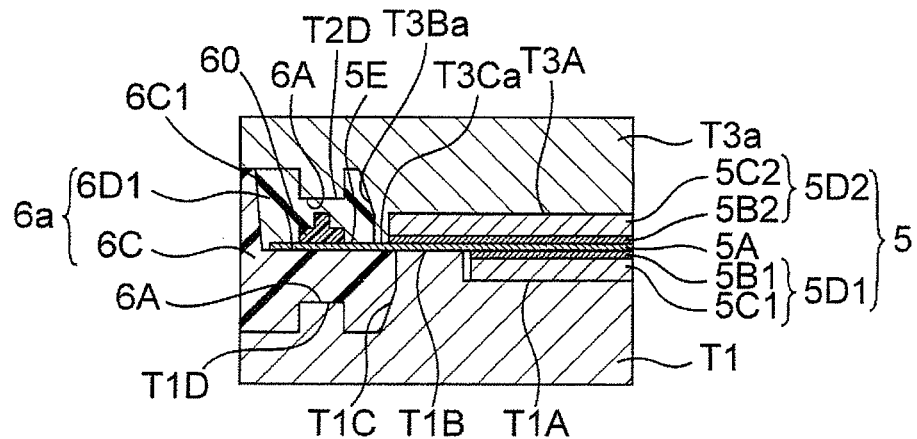
FIG. 16C is a schematic explanatory view illustrating a step subsequent to that in FIG. 16B.
Figure 17:
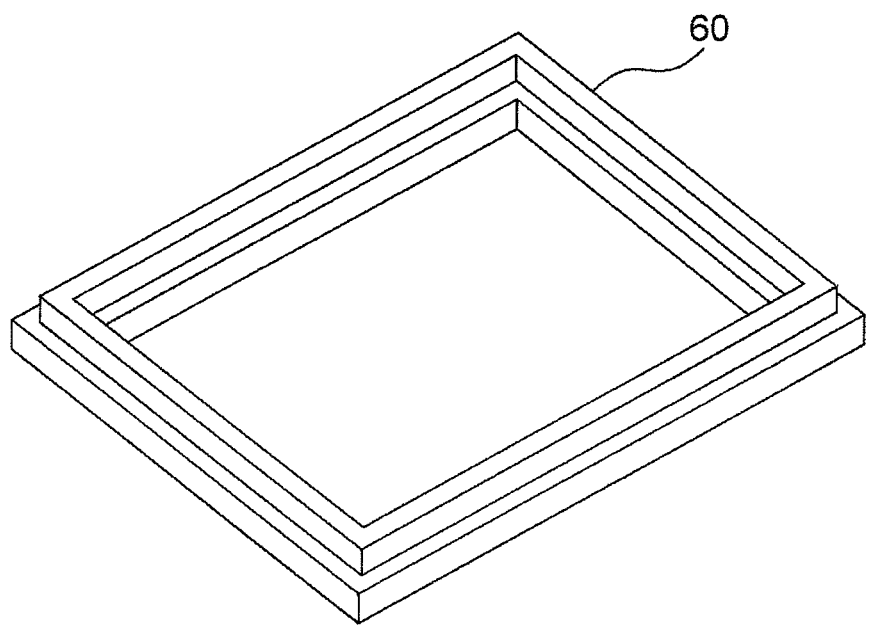
FIG. 17 is a perspective view of a pushing member for preventing raising or peeling.

In the same way as in the second embodiment, a primary molded body 6C is first molded as illustrated in FIG. 16A. Thereafter, as illustrated in 16B, an MEA principal part 5 is arranged in a depression T1A in a first mold T1. Thereafter, as illustrated in FIG. 16B, a raising or peeling-preventing pushing member 60 is arranged on the polymer electrolyte membrane 5A positioned on a flat region 6C1 of the primary molded body 6C.

As illustrated in FIG. 17, the pushing member 60 is formed into a rectangular frame form so as to correspond to the flat region 6C1 of the primary molded body 6C. The pushing member comes into surface-contact with the polymer electrolyte membrane 5A arranged on the flat region 6C1 of the primary molded body 6C, so as to prevent a raising or peeling of the polymer electrolyte membrane 5A by the weight of the member itself. It is sufficient for the pushing member 60 to realize the prevention of a raising or peeling of the polymer electrolyte membrane 5A. Thus, the member may be made into some other shape, or may include plural members. The pushing member 60 is made of a thermoplastic resin (preferably, the same thermoplastic resin which constitutes the frame 6).

After the arrangement of the pushing member 60, a third mold T3a and the first mold T1 are clamped to each other. A thermoplastic resin which is to constitute a secondary molded body 6D1 is caused to flow into between the molds by injection or the like, thereby molding the secondary molded body 6D1 integrated with the pushing member 60. In this way, the primary molded body 6C and the secondary molded body 6D1 are integrated with each other to mold a frame 6a.

Figure 16D:
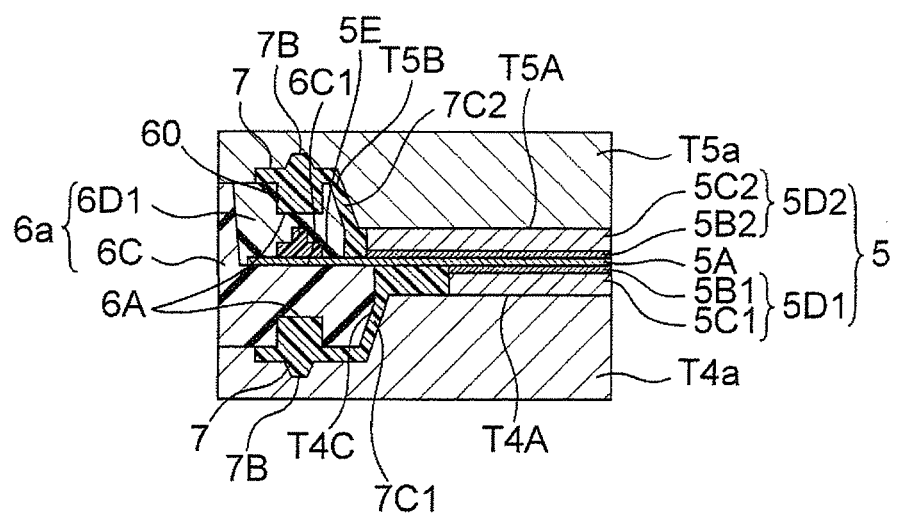
FIG. 16D is a schematic explanatory view illustrating a step subsequent to that in FIG. 16C.

After the molding of the secondary molded body 6D1, as illustrated in FIG. 16D, the frame 6a to which the MEA principal part 5 is joined is arranged between a fourth mold T4a and a fifth mold T5a. Thereafter, the fourth mold T4a and the fifth mold T5a are clamped to each other to mold a gasket 7 and extending regions 7C1 and 7C2 on the frame 6a (see FIG. 12).

As described above, the MEA related to the fifth embodiment of the invention is produced.

According to the method for producing the MEA related to the fifth embodiment of the invention, the secondary molded body 6D1 can be certainly prevented from being raised or peeled. Thus, the breaking and the deformation of the polymer electrolyte membrane can be certainly prevented. Moreover, it is unnecessary to raise the precision of the molds or control the resin pressures strictly.

Figure 21A:
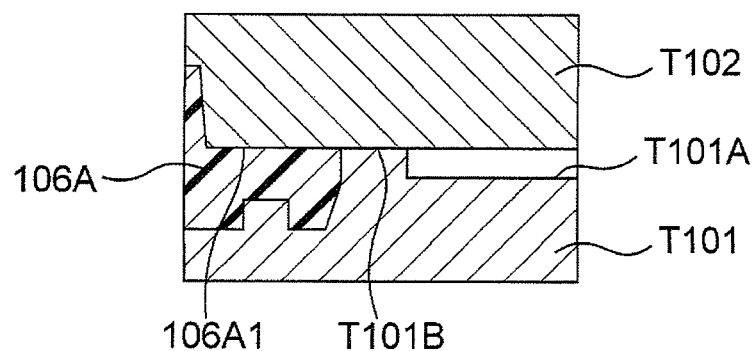
FIG. 21A is a schematic explanatory view illustrating a step for producing an MEA in a second conventional example, wherein a joint region between an MEA principal part and a frame is enlarged and shown.
Figure 21B:
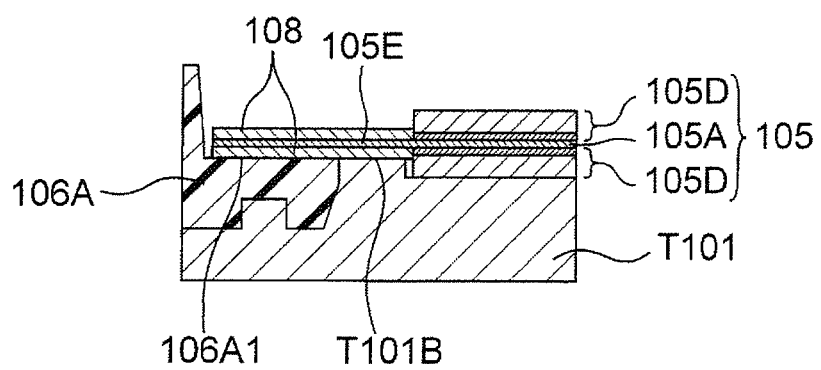
FIG. 21B is a schematic explanatory view illustrating a step subsequent to that in FIG. 21A.
Figure 21C:
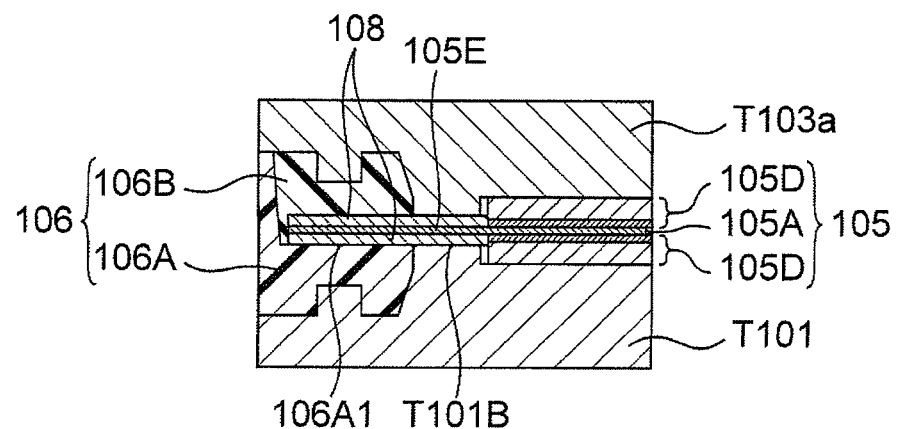
FIG. 21C is a schematic explanatory view illustrating a step subsequent to that in FIG. 21B.
Figure 21D:
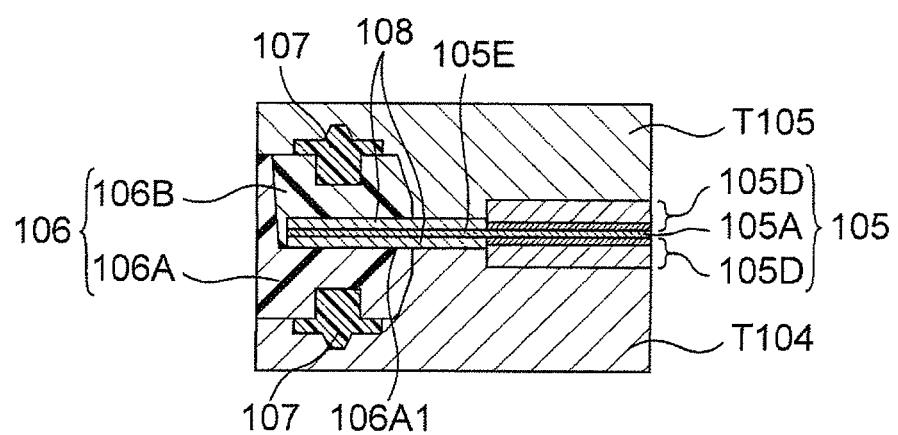
FIG. 21D is a schematic explanatory view illustrating a step subsequent to that in FIG. 21C.
Figure 22A:
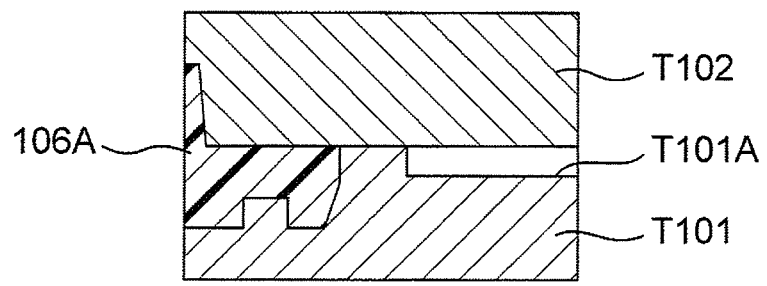
FIG. 22A is a schematic explanatory view illustrating a step for producing an MEA in a third conventional example, wherein a joint region between an MEA principal part and a frame is enlarged and shown.
Figure 22B:
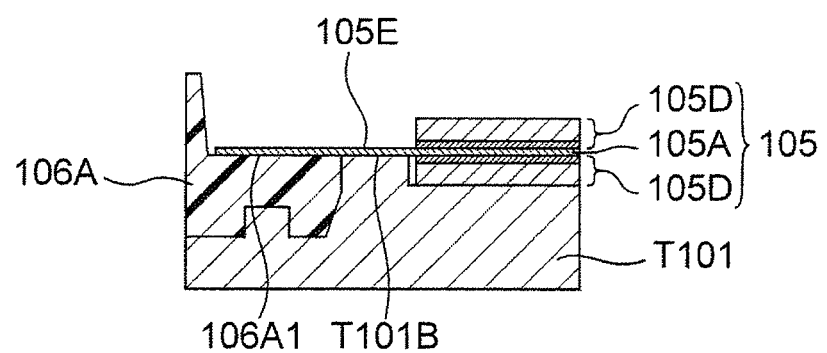
FIG. 22B is a schematic explanatory view illustrating a step subsequent to that in FIG. 22A.
Figure 22C:
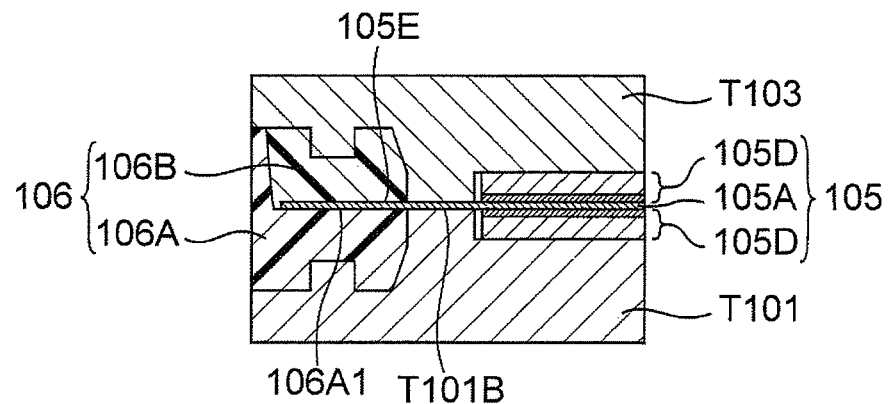
FIG. 22C is a schematic explanatory view illustrating a step subsequent to that in FIG. 22B.
Figure 22D:
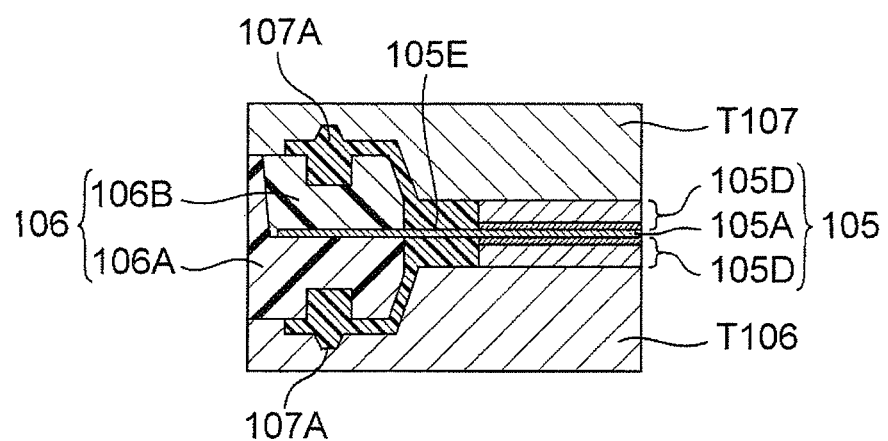
FIG. 22D is a schematic explanatory view illustrating a step subsequent to that in FIG. 22C.
Figure 23:
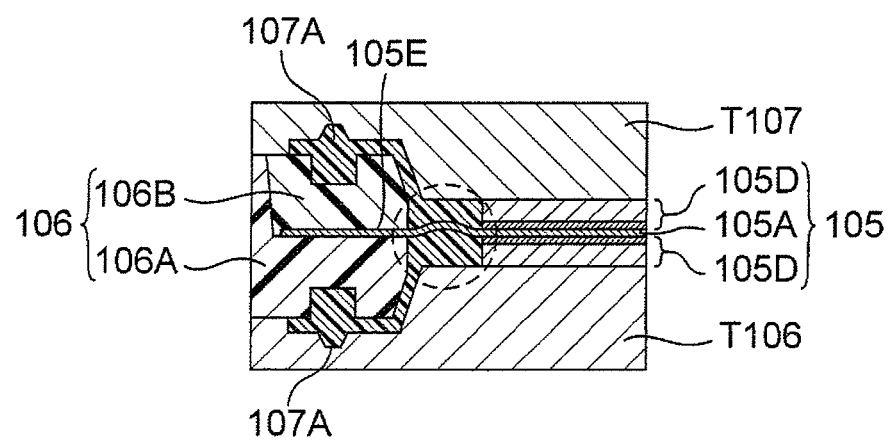
FIG. 23 is a schematic explanatory view illustrating a state that the MEA principal part and the frame are joined to each other in a polymer-electrolyte-membrane-deformed state in the process for producing the MEA in the third conventional example.

The following will describe results of an endurance test made about the MEA related to the fifth embodiment of the invention, and the MEA of second conventional example (see FIG. 21D), wherein a reinforcing membrane was set on the circumferential region of a polymer electrolyte membrane.

As the MEA related to the fifth embodiment of the invention, there was used an MEA having the size and material described as one example of the first embodiment. The MEA was sandwiched between a pair of carbon separators to form a cell. About the cell, the endurance test was made. As the MEA of second conventional example, there was used an MEA wherein the size of each of catalyst layers and gas diffusion layers on the anode side and the cathode side was a size of 120 mm×120 mm. The MEA was sandwiched between a pair of carbon separators to form a cell. About the cell, the endurance test was made. The catalyst layers were joined to the gas diffusion layers, respectively, by hot press under the same conditions (at a pressure of 0.5 MPa and 135° C. for 5 minutes) for the MEA related to the fifth embodiment.

The driving temperature of the cells was set to 90° C., and the used fuel gas and oxidizer gas each had a dew point of 65° C. The current density, the availability ratio of the oxidizer gas, and that of the fuel gas were set to 0.16 A/cm$^2$, 55% and 75%, respectively.

Figure 18:
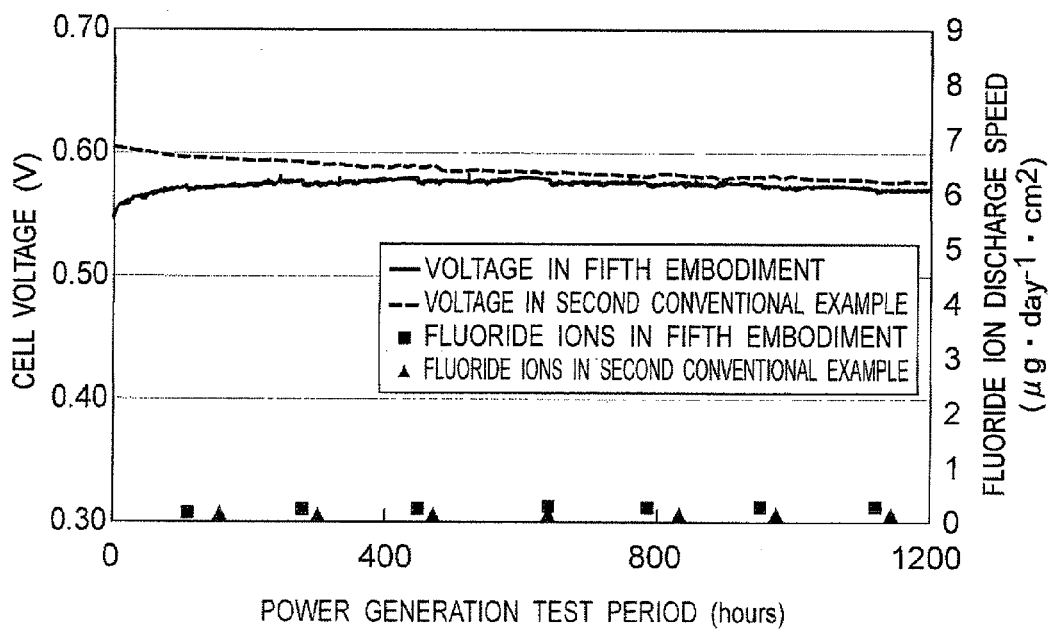
FIG. 18 is a graph showing each voltage change in a power generation test, and results obtained by making a periodical measurement of the discharge speed of fluoride ions contained in water discharged from each of cells.

FIG. 18 is a graph showing each voltage change in the power generation test, and results each obtained by making a periodical measurement of the discharge speed of fluoride ions contained in water discharged from each of the cells. In FIG. 18, a solid line represents the change in the voltage value in the cell having the MEA related to the fifth embodiment. In FIG. 18, a broken line represents the change in the voltage value in the cell having the MEA of second conventional example. In FIG. 18, square dots represent results obtained by making a periodical measurement of the discharge speed of the fluoride ions discharged from the cell having the MEA related to the fifth embodiment. In FIG. 18, triangular dots represent results obtained by making a periodical measurement of the discharge speed of the fluoride ions discharged from the cell having the MEA of second conventional example.

It is understood from FIG. 18 that in the cell having the MEA related to the fifth embodiment, the voltage change and the discharge speed of the fluoride ions are equivalent to those in the cell having the MEA of conventional 2. It is also understood from FIG. 18 that about the cell having the MEA related to the fifth embodiment, a tendency of a deterioration with the passage of time is hardly observed in the same way as about the cell having the MEA of conventional 2. In conclusion, it is understood that according to the MEA related to the fifth embodiment, a sufficient power generating performance and endurance can be certainly kept even when a reinforcing membrane is not permitted to be set up on the circumferential region of a polymer electrolyte membrane as in the MEA of second conventional example.

Figure 19:
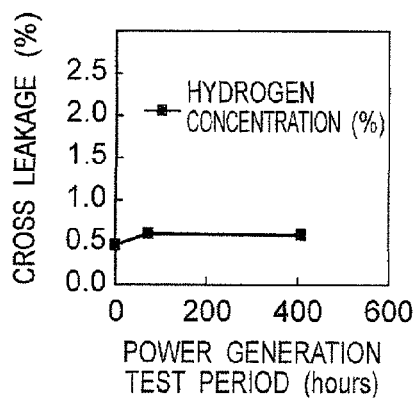
FIG. 19 is a graph showing a result obtained by measuring, relative to a period for the power generation test, the generation ratio of cross leakage of a fuel gas from the anode side to the cathode side.
Figure 20A:
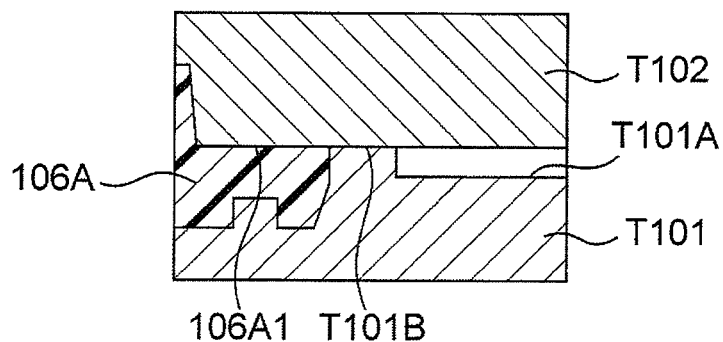
FIG. 20A is a schematic explanatory view illustrating a step for producing an MEA in a first conventional example, wherein a joint region between an MEA principal part and a frame is enlarged and shown.
Figure 20B:
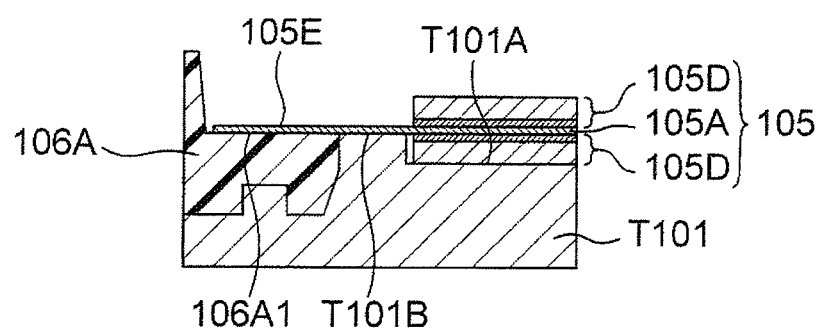
FIG. 20B is a schematic explanatory view illustrating a step subsequent to that in FIG. 20A.
Figure 20C:
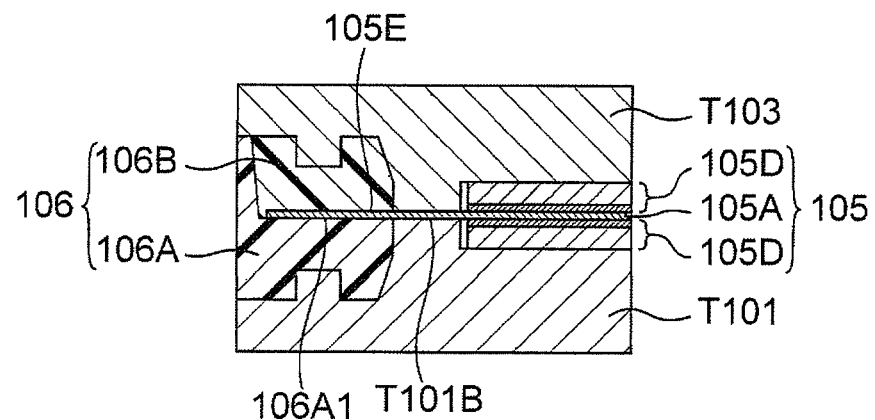
FIG. 20C is a schematic explanatory view illustrating a step subsequent to that in FIG. 20B.
Figure 20D:
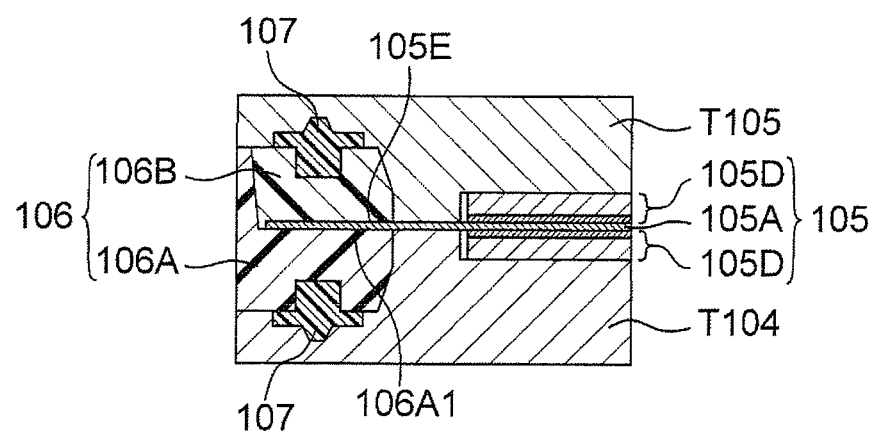
FIG. 20D is a schematic explanatory view illustrating a step subsequent to that in FIG. 20C.

A case where a gap is present between the frame of an MEA and a polymer electrolyte membrane causes a rise in the risk of the generation of the so-called cross leakage, i.e., the leakage of a fuel gas from the anode side to the cathode side. FIG. 19 is a graph showing a result obtained by measuring, relatively to period for the power generation test, the generation quantity of the cross leakage of a fuel gas from the anode side to the cathode side. The method for measuring the cross leakage quantity was as follows: in the state that nitrogen gas was caused to flow into the cathode side and hydrogen gas was caused to flow into the anode side, respectively, the amount of each of the gases being equal to that when power was generated, the ratio of the hydrogen gas contained in the nitrogen gas in the cathode side was measured by gas chromatography.

It is understood from FIG. 19 that the generation quantity of the cross leakage of the fuel gas in the cell having the MEA related to the fifth embodiment is 1% or less, which is an ordinary ratio or level at which the fuel gas is leaked through the polymer electrolyte membrane. It is understood from this fact that the frame of the MEA related to the fifth embodiment is sufficiently joined to the polymer electrolyte membrane without generating any gap.

It is understood from the above-mentioned results that the method of the invention for producing an MEA makes it possible to decrease damage onto its polymer electrolyte membrane sufficiently and form a frame capable of preventing a fall in sealing performance sufficiently even when a reinforcing membrane as in the MEA of second conventional example is not set. In conclusion, the MEA produced by the producing method of the invention has performances equivalent to those of any MEA having a reinforcing membrane, such as second conventional example, from the viewpoint of power generation voltage and endurance.

By properly combining the arbitrary embodiments of the aforementioned various embodiments, the effects possessed by the embodiments can be produced.

Although the present invention has been fully described in connection with the preferred embodiments thereof with reference to the accompanying drawings, it is noted that various changes and modifications are apparent to those skilled in the art. Such changes and modifications are to be understood as included within the scope of present invention as defined by the appended claims unless they depart therefrom.

The entire disclosure of Japanese Patent Application No. 2007-315476 filed on Dec. 6, 2007, including specification, claims, drawings, and summary are incorporated herein by reference in its entirety.

The method for producing an electrode-membrane-frame assembly according to the invention makes it possible to prevent its polymer electrolyte membrane from being broken or deformed without raising the precision of molds or controlling the resin pressures strictly. Thus, the method is useful as a method for producing a solid polymer electrolyte fuel cell and an electrode-membrane-frame assembly used in the solid polymer electrolyte fuel cell.

The invention claimed is:

1. A method for producing an electrode-membrane-frame assembly, comprising:
providing an electrode-membrane-frame assembly principal part having a polymer electrolyte membrane with opposing surfaces, a first catalyst layer arranged on one of the surfaces of the electrolyte membrane, a first gas diffusion layer arranged on a surface of the first catalyst layer and inside a circumferential region of the principal part, a second catalyst layer arranged on the other surface of the electrolyte membrane, and a second gas diffusion layer arranged on a surface of the second catalyst layer and inside the circumferential region of the principal part so that the first and second gas diffusion layers have opposing regions that oppose each other with the electrolyte membrane interposed therebetween and so that a position of an outer circumference of the second gas diffusion layer is different than that of an outer circumference of the first gas diffusion layer;

providing a frame-shaped primary molded body fitted in a first molding die;

arranging the principal part such that the circumferential region of the principal part is disposed on a flat region located in an inner-circumferential portion of the primary molded body, the flat region being parallel to a plane direction of the electrolyte membrane, and such that an outer circumferential portion of either the first gas diffusion layer or the second gas diffusion layer, said outer circumferential portion being positioned outside the opposing regions of the first and second gas diffusion layers, is opposed to the flat region in a thickness direction of the electrolyte membrane so that a portion of the electrolyte membrane is interposed, in the thickness direction of the electrolyte membrane, between said outer circumferential portion and the flat region;

clamping a second molding die to the first molding die with the primary molded body fitted in the first molding die; and causing a thermoplastic resin to flow into between the second molding die and the first molding die together with the primary molded body so as to mold a secondary molded body such that the primary molded body together with the secondary molded body form a frame, which is integrated with the principal part.

2. The method for producing an electrode-membrane-frame assembly according to claim 1, wherein when the secondary molded body is molded, the molding of the secondary molded body is attained to cause a portion of the resin constituting the secondary molded body to be present so as to be intermixed with said outer circumferential portion.

3. The method for producing an electrode-membrane-frame assembly according to claim 1, further comprising removing the frame integrated with the principal part from the first and second molding dies;

arranging the frame and the principal part between a third molding die and a fourth molding die, and then clamping the third molding die and the fourth molding die to each other, such that a gap is formed between the primary molded body and the third molding die and a gap is formed between the secondary molded body and the fourth molding die; and causing a thermoplastic resin or thermoplastic elastomer to flow into the gaps, thereby molding elastic bodies in the gaps.

4. The method for producing an electrode-membrane-frame assembly according to claim 3, wherein, in said molding of the elastic bodies, formation of the elastic bodies is performed so as to cause a portion of the resin or elastomer to be intermixed with said outer circumferential portion.

5. The method for producing an electrode-membrane-frame assembly according to claim 1, wherein, in said clamping of the second molding die to the first molding die, after the circumferential region of the principal part is arranged on the flat region, a pushing member is arranged on the circumferential region of the principal part to restrain the circumferential region of the principal part from rising away from the flat region.

6. The method for producing an electrode-membrane-frame assembly according to claim 1, wherein the second gas diffusion layer is formed into a size permitting, in a plan view viewed in the thickness direction of the electrolyte membrane, a profile of the second gas diffusion layer to be included within a profile of the first gas diffusion layer, and the second gas diffusion layer is arranged so that, in the plan view, the profile thereof is included within the profile of the first gas diffusion layer, whereby the second gas diffusion layer is arranged so that, in the plan view, the position of the outer circumference thereof is different than that of the outer circumference of the first gas diffusion layer.

7. The method for producing an electrode-membrane-frame assembly according to claim 1, wherein the first and second gas diffusion layers are each formed into a rectangular form in a plan view viewed in the thickness direction of the electrolyte membrane, and the second gas diffusion layer is arranged to cause long sides of the rectangular form thereof to intersect with the paired long sides of the rectangular form of the first gas diffusion layer, respectively, whereby the second gas diffusion layer is arranged so that, in the plan view, the position of the outer circumference thereof is different than that of the outer circumference of the first gas diffusion layer.

8. The method for producing an electrode-membrane-frame assembly according to claim 1, wherein the first gas diffusion layer and the second gas diffusion layer are formed into the same size in a plan view viewed in the thickness direction of the electrolyte membrane, and the second gas diffusion layer is arranged to be deviated from the first gas diffusion layer in the plan view while the second gas diffusion layer has a region overlapping with the first gas diffusion layer in the plan view, whereby the second gas diffusion layer is arranged so that, in the plan view, the position of the outer circumference thereof is different than that of the outer circumference of the first gas diffusion layer.

* * * * *